(12) United States Patent
Takakusagi et al.

(10) Patent No.: US 10,353,520 B2
(45) Date of Patent: Jul. 16, 2019

(54) DISPLAY DEVICE WITH CAPACITIVE TOUCH PANEL, CAPACITIVE TOUCH PANEL

(71) Applicant: Oji Holdings Corporation, Tokyo (JP)

(72) Inventors: Emi Takakusagi, Tokyo (JP); Sakura Miyazaki, Tokyo (JP); Satoru Matsubayashi, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 13 days.

(21) Appl. No.: 14/364,042

(22) PCT Filed: Nov. 7, 2012

(86) PCT No.: PCT/JP2012/078841
§ 371 (c)(1),
(2) Date: Sep. 17, 2014

(87) PCT Pub. No.: WO2013/069683
PCT Pub. Date: May 16, 2013

(65) Prior Publication Data
US 2015/0015812 A1    Jan. 15, 2015

(30) Foreign Application Priority Data
Nov. 7, 2011 (JP) .................. 2011-243796

(51) Int. Cl.
*B32B 7/12* (2006.01)
*G06F 3/044* (2006.01)

(52) U.S. Cl.
CPC ............ *G06F 3/044* (2013.01); *B32B 7/12* (2013.01); *B32B 2307/202* (2013.01);
(Continued)

(58) Field of Classification Search
CPC .. G02F 1/13338; G06F 3/0412; G06F 3/0421; G06F 3/044; G06F 3/045;
(Continued)

(56) References Cited

U.S. PATENT DOCUMENTS 4,295,712 A * 10/1981 Ishiwatari ........... G02F 1/13394
349/156
4,696,860 A * 9/1987 Epperson ................ G06F 3/045
200/514

(Continued)

FOREIGN PATENT DOCUMENTS

| CN | 1764895 A | 4/2006 |
|---|---|---|
| CN | 101620454 A | 1/2010 |

(Continued)

OTHER PUBLICATIONS

Request for invalidation Appeal in Korean Patent Application No. 10-1501907, mailed Apr. 30, 2015.

(Continued)

*Primary Examiner* — Grant Sitta
(74) *Attorney, Agent, or Firm* — Knobbe, Martens, Olson & Bear, LLP

(57) ABSTRACT

A display device with a capacitive touch panel including a liquid crystal display having a polarizing plate disposed on a top surface thereof; and a capacitive touch panel which is disposed in front of the liquid crystal display such that a gap is provided between the touch panel and the polarizing plate, and has an outer edge which is fixed to the liquid crystal display via an adhesive layer therebetween. The touch panel includes a transparent substrate, a conductive layer which is provided on the side of the liquid crystal display of the transparent substrate, and a protective sheet which is laminated on the conductive layer via an adhesive layer, and a surface of the protective sheet opposed to the liquid crystal display is an irregular surface having minute irregularities, (Continued)

and the irregular surface has a surface roughness of 1.5 nm to 400 nm.

19 Claims, 4 Drawing Sheets

(52) U.S. Cl.
 CPC ..... *B32B 2307/412* (2013.01); *B32B 2457/20* (2013.01); *B32B 2457/202* (2013.01)

(58) Field of Classification Search
 CPC ........... G06F 2203/041; G06F 3/03547; G06F 3/0414; G06F 3/041; G06F 3/0416; G06F 3/0418; G06F 3/046; G06F 3/047; G06F 2203/04107; G06F 2203/04111; G06K 11/06; G09G 2300/0434; G09G 2300/0439; G09G 2300/0443; G09G 2300/0447; G09G 2300/0465; H05K 9/0073; H05K 9/0079; H05K 9/0081; H05K 9/0088
 USPC ................................. 345/173–175
 See application file for complete search history.

(56) References Cited

U.S. PATENT DOCUMENTS

| | | | |
|---|---|---|---|
| 4,700,025 A | 10/1987 | Hatayama et al. | |
| 5,410,329 A * | 4/1995 | Tagawa | G06F 3/0412 345/104 |
| 6,016,134 A * | 1/2000 | Ota | G02F 1/13338 178/18.03 |
| 6,252,703 B1 | 6/2001 | Nakamura et al. | |
| 7,081,888 B2 * | 7/2006 | Cok | G06F 3/045 345/173 |
| 9,151,875 B2 | 10/2015 | Takamiya et al. | |
| 2004/0213990 A1 * | 10/2004 | Barth | A47G 1/06 428/331 |
| 2005/0037184 A1 * | 2/2005 | Halsey, IV | B32B 17/10018 428/210 |
| 2005/0184969 A1 * | 8/2005 | Dunn | G06F 3/045 345/173 |
| 2005/0274596 A1 * | 12/2005 | Nashiki | H01H 13/704 200/512 |
| 2006/0157289 A1 * | 7/2006 | Chou | G06F 3/045 178/18.01 |
| 2006/0238484 A1 * | 10/2006 | Yu | G02F 1/133528 345/102 |
| 2007/0184260 A1 * | 8/2007 | Saito | C08J 7/047 428/323 |
| 2008/0165158 A1 | 7/2008 | Hotelling et al. | |
| 2008/0241554 A1 | 10/2008 | Tanaka | |
| 2009/0058235 A1 | 3/2009 | Uchimi | |
| 2009/0207151 A1 * | 8/2009 | Liu | G06F 3/044 345/174 |
| 2009/0225050 A1 | 9/2009 | Toyomaki | |
| 2010/0039708 A1 | 2/2010 | Suzuki et al. | |
| 2010/0040871 A1 | 2/2010 | Saito et al. | |
| 2010/0053101 A1 * | 3/2010 | Nozawa | G02B 1/105 345/173 |
| 2010/0072467 A1 | 3/2010 | Yamazaki et al. | |
| 2010/0165551 A1 * | 7/2010 | Chen | G02B 1/005 361/679.01 |
| 2010/0231542 A1 * | 9/2010 | Momose | G06F 3/044 345/173 |
| 2012/0032900 A1 * | 2/2012 | Itoh | C23C 14/086 345/173 |
| 2012/0044182 A1 * | 2/2012 | Seo | G06F 3/044 345/173 |
| 2012/0050201 A1 * | 3/2012 | Nozawa | G06F 3/0416 345/173 |
| 2012/0098788 A1 * | 4/2012 | Sekiguchi | G06F 3/044 345/174 |
| 2012/0105359 A1 * | 5/2012 | Kim | G06F 3/0412 345/174 |
| 2012/0200816 A1 * | 8/2012 | Krasnov | G02F 1/133308 349/137 |
| 2012/0229423 A1 * | 9/2012 | Takamiya | G02B 1/105 345/175 |
| 2012/0256865 A1 * | 10/2012 | Hashimoto | G06F 3/041 345/173 |
| 2012/0301676 A1 | 11/2012 | Ushida et al. | |

FOREIGN PATENT DOCUMENTS

| | | | |
|---|---|---|---|
| CN | 102004595 A | | 4/2011 |
| EP | 2053495 A2 | | 4/2009 |
| EP | 2090966 A1 | | 8/2009 |
| EP | 2306283 A2 | | 4/2011 |
| JP | S63-289732 A | † | 11/1988 |
| JP | H08-109044 A | † | 4/1996 |
| JP | A-10-073718 | | 3/1998 |
| JP | A-2000-105669 | | 4/2000 |
| JP | A-2000-167969 | | 6/2000 |
| JP | A-2001-051262 | | 2/2001 |
| JP | 2001-324707 A | † | 11/2001 |
| JP | A-2002-189565 | | 7/2002 |
| JP | 2004077887 A | | 3/2004 |
| JP | A-2005-031790 | | 2/2005 |
| JP | 2005-141325 A | † | 6/2005 |
| JP | 2005-535548 A | † | 11/2005 |
| JP | 2006-023904 A | † | 1/2006 |
| JP | A-2007-034736 | | 2/2007 |
| JP | A-2007-077188 | | 3/2007 |
| JP | 2008-083491 A | † | 4/2008 |
| JP | A-2008-134489 | | 6/2008 |
| JP | A-2008-239724 | | 10/2008 |
| JP | A-2009-053440 | | 3/2009 |
| JP | A-2009-098833 | | 5/2009 |
| JP | A-2009-211377 | | 9/2009 |
| JP | A-2009-263600 | | 11/2009 |
| JP | A-2010-015574 | | 1/2010 |
| JP | A-2010-042671 | | 2/2010 |
| JP | A-2010-060643 | | 3/2010 |
| JP | A-2010-064423 | | 3/2010 |
| JP | A-2010-066761 | | 3/2010 |
| JP | A-2010-091966 | | 4/2010 |
| JP | 2010-108172 A | † | 5/2010 |
| JP | A-2010-515969 | | 5/2010 |
| JP | A-2010-140370 | | 6/2010 |
| JP | A-2010-168419 | | 8/2010 |
| JP | 2010-211647 A | † | 9/2010 |
| JP | A-2010-228401 | | 10/2010 |
| JP | A-2010-285524 | | 12/2010 |
| JP | A-2011-033948 | | 2/2011 |
| JP | 2011-070012 A | † | 4/2011 |
| JP | WO 2011077981 A1 * | 6/2011 | ............ G06F 3/041 |
| JP | A-2011-133881 | | 7/2011 |
| JP | A-2011-153169 | | 8/2011 |
| JP | A-2011-154512 | | 8/2011 |
| JP | 2011-170308 A | † | 9/2011 |
| JP | A-2011-177938 | | 9/2011 |
| JP | 2011-202104 A | † | 10/2011 |
| JP | A-2011-209512 | | 10/2011 |
| JP | 2012033135 A | | 2/2012 |
| KR | 10-2011-0118024 | | 10/2011 |
| TW | M348999 | | 1/2009 |
| TW | 2010030765 A | | 8/2010 |
| TW | 201113580 A | | 4/2011 |
| TW | 201129831 A | | 9/2011 |
| TW | 201222501 A | | 6/2012 |
| WO | WO 2004/014814 A1 | | 2/2004 |
| WO | WO 2004/095252 A1 | | 11/2004 |
| WO | WO 2008/108153 | | 9/2008 |
| WO | 2010/114056 A1 | † | 10/2010 |
| WO | WO 2011/108394 A1 | | 9/2011 |

OTHER PUBLICATIONS

International Search Report in PCT/JP2012/078841 dated Dec. 18, 2012.

(56) References Cited

OTHER PUBLICATIONS

Fine Powder Handbook, edited by Motoji Jinbo et al., Asakura-shoten, p. 52, 1991.
Request for Invalidation Appeal in Japanese Patent Application No. 2013-543003, mailed Apr. 16, 2015.
Notification (third party observation) in European Patent Application No. 12848710.5, mailed Aug. 7, 2015.
Written Argument by the opponent of Request for Invalidation Appeal in Korean Patent Application No. 10-2014-7010789, mailed Nov. 19, 2015.
Request for Invalidation Appeal in Taiwanese Patent Application No. 101141394, mailed Dec. 17, 2015.
Search Report in European Patent Application No. 12848710.5, dated Nov. 26, 2015.
Atmel: "Atmel Touch Sensor Design Guide" Apr. 1, 2009 pp. 1-72, XP055067455; Section 2.3.1 entitled "Substrates"; p. 13; Retrieved from the Internet: http://pdf.datasheetarchive.com/indexerfiles/Datasheets-SX25/DSASW0013329.pdf [retrieved on Jun. 20, 2013].
ISO 13468-1:1996, (Aug. 15, 1996), "Plastics-Determination of the total 4 luminous transmittance of transparent materials", pp. 1-3, (International Standard corresponding to JIS-K 73 61-1 listed on the Refutation of Invalidation trial case).
ISO-14782:1999, (Aug. 15, 1999), "Plastics-Determination of haze for transparent materials", pp. 1-3, (International Standard corresponding to JIS-K7136 listed on the Refutation of Invalidation trial case).
Refutation of Invalidation trial case in Japanese Patent Application No. 2013-543003, mailed Apr. 19, 2016.
Statement of oral trial examination in Japanese Patent Application No. 2013-543003, mailed Sep. 4, 2015.
Petition in Japanese Patent Application No. 2013-543003, mailed Nov. 27, 2015.
Notice of trial decision in Japanese Patent Application No. 2013-543003, mailed Dec. 24, 2015.
Fuji Keizai Group, "Trend of the Market for Optical Transparent Adhesive for Touch Panel", No. 1170, marketing report, Published on Aug. 25, 2011, Japan.
Request for Invalidation Appeal in Taiwanese Patent Application No. 101141394, dated Mar. 10, 2016.
ISO 13468-1:1996, (Aug. 15, 1996), "Plastics-Determination of the total 4 luminous transmittance of transparent materials", pp. 1-3, (International Standard corresponding to TIS-K 73 61-1 listed on the Refutation of Invalidation trial case).
ISO-14782:1999, (Aug. 15, 1999), "Plastics-Determination of haze for transparent materials", pp. 1-3, (International Standard corresponding to TIS-K7136 listed on the Refutation of Invalidation trial case).
Appeal Decision in Japanese Patent Application No. 2013-543003, mailed Jul. 4, 2016.
Written Argument by the opponent of Request for Invalidation Appeal in Korean Patent Application No. 10-2014-7010789, mailed Jul. 4, 2016.
Office Action in Chinese Patent Application No. 201280052297.5, dated Dec. 2, 2014.
Office Action in Taiwanese Patent Application No. 101141394, dated Dec. 25, 2014.
Supplemental Invalidity Brief in Taiwanese Patent Application No. 101141394No.1, mailed Oct. 12, 2017.
Supplemental Invalidity Brief in Taiwanese Patent Application No. 101141394No.2, mailed Oct. 12, 2017.
Written Answer in Korean Patent Application No. 10-2014-7010789, dated Apr. 20, 2017.
Supplemental Invalidity Brief in Taiwanese Patent Application No. 101141394, mailed Feb. 23, 2017.
Notification (third party observation) in European Patent Application No. 12848710.5, mailed Aug. 24, 2017.
Notice of Grounds for Rejections of Correction in Korean Patent Application No. 10-2014-7010789, dated Oct. 17, 2017.
Supplemental Invalidity Brief, in Taiwanese Patent Application No. 101141394N01, mailed Dec. 29, 2017, partial translation.

\* cited by examiner
† cited by third party

DISPLAY DEVICE WITH CAPACITIVE TOUCH PANEL, CAPACITIVE TOUCH PANEL

TECHNICAL FIELD

The present invention relates to a display device with a capacitive touch panel and a capacitive touch panel.

Priority is claimed on Japanese Patent Application No. 2011-243796, filed Nov. 7, 2011, the content of which is incorporated herein by reference.

BACKGROUND ART

Touch panels are electronic components functioning as position input devices. These are combined with display devices such as liquid crystal displays, and widely used in cellular phones, portable game machines, and the like. Touch panels are interfaces capable of, when an operator points a finger or an input pen at a specific position in the touch panel based on the display on a screen and the device senses information of the specific position, performing an appropriate operation that the operator wants. There are various types of touch panels according to principles of the operation of detecting the pointed-to position, and resistive or capacitive types are widely used. Particularly, the use of capacitive types has rapidly expanded mainly in mobile devices such as cellular phones. As for representative detection methods of the capacitive types, two methods, i.e., a surface type related to analog detection and a projection type by an integration detection method using an electrode on which patterning has been performed are exemplified.

As capacitive touch panels, touch panels provided with a glass plate having a conductive layer provided on one or both surfaces thereof (hereinafter, may be referred to as sensor glass) are used, and in general, a glass plate (hereinafter, may be referred to as cover glass) is laminated in front (touch surface side) of the sensor glass via an adhesive layer. In addition, a protective sheet is further stuck in front of the cover glass in order to prevent breakage of the cover glass and scattering of broken pieces.

As the protective sheet used for such purposes, protective sheets having a hard coating layer are used in many cases, since these have excellent scratch resistance. In addition, if desired, a layer having another function such as an antifouling function or an antireflection function is provided, or the hard coating layer is formed to have these functions (for example, PTLS 1 to 3).

In general, touch panels are attached to a front surface of a display unit using an adhesive. However, when the display unit has a particularly large size, only an outer edge of the touch panel may be fixed with an adhesive to another member such as a liquid crystal display due to cost considerations.

FIG. 9 shows a schematic cross-sectional view showing a configuration of a display device 200 with a capacitive touch panel, in which only an outer edge of a conventional capacitive touch panel is fixed to a front surface of the display unit via an adhesive. The display device 200 with a capacitive touch panel includes a liquid crystal display 210 having a polarizing plate 211 disposed on a top surface thereof, and a capacitive touch panel 220. The capacitive touch panel 220 includes a glass substrate 221, a conductive layer 222 provided in front of the glass substrate 221, a cover glass 224 laminated in front of the conductive layer 222 via an adhesive layer 223, and a protective sheet 227 laminated in front of the cover glass 224 via an adhesive layer 226, and a printing layer 225 is formed in an outer edge of the back surface of the cover glass 224. The capacitive touch panel 220 is disposed over a front surface of the liquid crystal display 210 such that a gap is provided between the capacitive touch panel 220 and the liquid crystal display 210, and its outer edge is fixed to the liquid crystal display 210 via an adhesive layer 230. Accordingly, a space is formed between the front surface of the liquid crystal display 210 and the back surface of the capacitive touch panel 220.

In optical film fields, when films, or a film and another member (for example, a glass plate) are brought into contact with each other, glare, Newton's rings, or blocking may occur. In order to prevent these phenomena, minute irregularities are provided on the surface of the film. The size of the irregularities to be formed is set according to performance to be requested (antiglare performance, anti-Newton ring performance, or antiblocking performance). In the case of the antiglare performance, the maximum size is set, and in the case of the antiblocking performance, the minimum size is set. As a method of forming such irregularities, a method of including particles in a hard coating layer is generally used (for example, PTLS 4 to 6).

CITATION LIST

Patent Literatures

[PTL 1] Japanese Unexamined Patent Application, First Publication No. 2007-77188
[PTL 2] Japanese Unexamined Patent Application, First Publication No. 2009-263600
[PTL 3] PCT International Publication No. WO2008/108153 pamphlet
[PTL 4] Japanese Unexamined Patent Application, First Publication No. 2010-42671
[PTL 5] Japanese Unexamined Patent Application, First Publication No. 2010-60643
[PTL 6] Japanese Unexamined Patent Application, First Publication No. 2011-33948

SUMMARY OF INVENTION

Technical Problem

In recent years, a reduction in the weight or thickness of touch panels has been highly requested. Under such a situation, single transparent substrate types having no cover glass have been used as the above-described capacitive touch panel. Examples of the single transparent substrate type capacitive touch panel include touch panels having a configuration in which a conductive layer is provided on a back surface of a transparent substrate and a protective sheet is laminated on the conductive layer, and touch panels having a configuration in which a conductive layer is provided on a front surface of a glass plate and a protective sheet is laminated on the conductive layer.

However, according to the examinations of the inventors of the invention, there is a problem in that Newton's rings occurs when a single transparent substrate type capacitive touch panel is attached to a display unit as shown in FIG. 9. The larger the size of the display unit, the more the problem occurs. A cause of the problem is thought to be that since the touch panel has only one transparent substrate, bending or distortion easily occurs and is difficult to correct while contact with the polarizing plate of the front surface of the display unit occurs around the center. Accordingly, a film having anti-Newton ring performance (anti-Newton ring film) is considered to be disposed on the back surface of the touch panel or the front surface of the display unit. However, the anti-Newton ring film which has been conventionally used has a high haze and is thus insufficient in transparency, thereby reducing the brightness of a touch surface. Accordingly, it is not preferable to apply the foregoing anti-Newton ring film to the display unit or the touch panel. Meanwhile, when a clear type film is used on the back surface of the touch panel or the front surface of the display unit, it may be brought into contact with the surface opposed thereto and may be difficult to return to its original state. When the clear type film does not return to its original state while being attached, the image of the display unit seems distorted, and thus a problem occurs in practical use. The invention is contrived in view of the above-described circumstances, and an object thereof is to provide a display device with a capacitive touch panel and a capacitive touch panel for which Newton's rings is less likely to occur and which are superior in brightness of a touch surface.

Solution to Problem

The inventors of the invention have conducted intensive studies, and as a result, have found that in a configuration in which a back surface of a single transparent substrate type capacitive touch panel and a front surface of a display unit are opposed to each other via a space, when the back surface of the touch panel (the surface opposed to the front surface of the display unit) or the front surface of the display unit (the surface opposed to the back surface of the capacitive touch panel) has a predetermined surface roughness, the above-described problems are solved, and have completed the invention.

The invention has the following aspects.

[1] A display device with a capacitive touch panel including: a display unit; and a capacitive touch panel which is disposed in front of the display unit such that a gap is provided between the capacitive touch panel and the display unit, wherein the capacitive touch panel has an outer edge which is fixed to the display unit via an adhesive layer therebetween, wherein the capacitive touch panel includes one glass substrate, a conductive layer which is provided behind the glass substrate, and a protective sheet which is laminated on the conductive layer via an adhesive layer, wherein the protective sheet has a surface having a surface roughness of 1.5 nm to 400 nm, and wherein the surface is opposed to the display unit.

[2] A display device with a capacitive touch panel including: a display unit; and a capacitive touch panel which is disposed in front of the display unit such that a gap is provided between the capacitive touch panel and the display unit, wherein the capacitive touch panel has an outer edge which is fixed to the display unit via an adhesive layer therebetween, wherein the capacitive touch panel includes one glass substrate, a conductive layer which is provided behind the glass substrate, and a protective sheet which is laminated on the conductive layer via an adhesive layer, wherein in the display unit, a surface has a surface roughness of 1.5 nm to 400 nm and wherein in the display unit, the surface is opposed to the capacitive touch panel.

[3] A display device with a capacitive touch panel including: a display unit; and a capacitive touch panel which is disposed in front of the display unit such that a gap is provided between the capacitive touch panel and the display unit, wherein the capacitive touch panel has an outer edge which is fixed to the display unit via an adhesive layer therebetween, wherein the capacitive touch panel includes one glass substrate, a conductive layer which is opposed to the display unit side of the glass substrate, and a protective sheet which is laminated on the conductive layer via an adhesive layer, wherein in the display unit, a surface has a surface roughness of 1.5 nm to 400 nm, and wherein in the display unit, the surface is opposed to the capacitive touch panel.

[4] A capacitive touch panel which is disposed in front of a display unit such that a gap is provided between the capacitive touch panel and the display unit, and has an outer edge which is fixed to the display unit via an adhesive layer therebetween, including: one glass substrate; a conductive layer which is provided behind the glass substrate; and a protective sheet which is laminated on the conductive layer via an adhesive layer, wherein the protective sheet has a surface having a surface roughness of 1.5 nm to 400 nm, and wherein the surface is opposed to the display unit.

[5] The capacitive touch panel according to [4], further including: a conductive layer which is opposed to the display unit side of the glass substrate; and a protective sheet which is laminated on the conductive layer via an adhesive layer.

In the present specification and claims, the surface roughness is a value measured by the following measuring method.

(Method of Measuring Surface Roughness)

Image capturing is performed in a 10 μm by 10 μm measurement area using a scanning probe microscope and using a Si single crystal probe as a probe, and an obtained image is subjected to an incrementing process to calculate the surface roughness.

The incrementing process may be realized by incrementing processing means connected to the scanning probe microscope. The incrementing processing means may be provided with a memory and a central processing unit (CPU).

Specifically, image capturing is performed in a 10 μm by 10 μm measurement area in a measurement mode set to a tapping mode using a scanning probe microscope (Nanoscope IIV and Nanoscope Ma manufactured by Veeco Instruments Inc.) and using a Si single crystal probe as a probe. It is preferable that using analysis software attached to the scanning probe microscope, a flatten process (zero-order) and a plane-fit process (XY) be performed one time on an obtained image, respectively, as incrementing processes for removing waviness, and then the surface roughness be calculated.

That is, the invention relates to the followings.

(1) A display device with a capacitive touch panel including: a display unit; and a capacitive touch panel which is disposed in front of the display unit such that a gap is provided between the capacitive touch panel and the display unit, wherein the capacitive touch panel has an outer edge which is fixed to the display unit via an adhesive layer therebetween, wherein the capacitive touch panel includes one transparent substrate, a conductive layer which is provided behind the transparent substrate, and a protective sheet which is laminated on the conductive layer via an adhesive layer, wherein the protective sheet has a surface having a surface roughness of 1.5 nm to 400 nm, and wherein the surface is opposed to the display unit.

(2) A display device with a capacitive touch panel including: a display unit; and a capacitive touch panel which is disposed in front of the display unit such that a gap is provided between the capacitive touch panel and the display unit, wherein the capacitive touch panel has an outer edge which is fixed to the display unit via an adhesive layer therebetween, wherein the capacitive touch panel includes one transparent substrate, a conductive layer which is provided behind the transparent substrate, and a protective sheet which is laminated on the conductive layer via an adhesive layer, wherein in the display unit, a surface has a surface roughness of 1.5 nm to 400 nm, and wherein in the display unit, the surface is opposed to the capacitive touch panel.

(3) A display device with a capacitive touch panel including: a display unit; and a capacitive touch panel which is disposed in front of the display unit such that a gap is provided between the capacitive touch panel and the display unit, wherein the capacitive touch panel has an outer edge which is fixed to the display unit via an adhesive layer therebetween, wherein the capacitive touch panel includes one transparent substrate, a conductive layer which is opposed to the display unit side of the transparent substrate, and a protective sheet which is laminated on the conductive layer via an adhesive layer, wherein in the display unit, a surface has a surface roughness of 1.5 nm to 400 nm, and wherein the surface is opposed to the capacitive touch panel.

(4) A capacitive touch panel which is disposed in front of a display unit such that a gap is provided between the capacitive touch panel and the display unit, and has an outer edge which is fixed to the display unit via an adhesive layer therebetween, including: one transparent substrate; a conductive layer which is provided behind the transparent substrate; and a protective sheet which is laminated on the conductive layer via an adhesive layer, wherein the protective sheet has a surface having a surface roughness of 1.5 nm to 400 nm, and wherein the surface is opposed to the display unit.

(5) The capacitive touch panel according to (4), further including: a conductive layer which is opposed to the display unit side of the transparent substrate; and a protective sheet which is laminated on the conductive layer via an adhesive layer.

Advantageous Effects of Invention

According to the invention, it is possible to provide a display device with a capacitive touch panel and a capacitive touch panel for which Newton's rings is less likely to occur and which are superior in brightness of a touch surface.

DESCRIPTION OF EMBODIMENTS

Hereinafter, embodiments of the invention will be described with reference to the accompanying drawings.

<First Embodiment>

Figure 1:
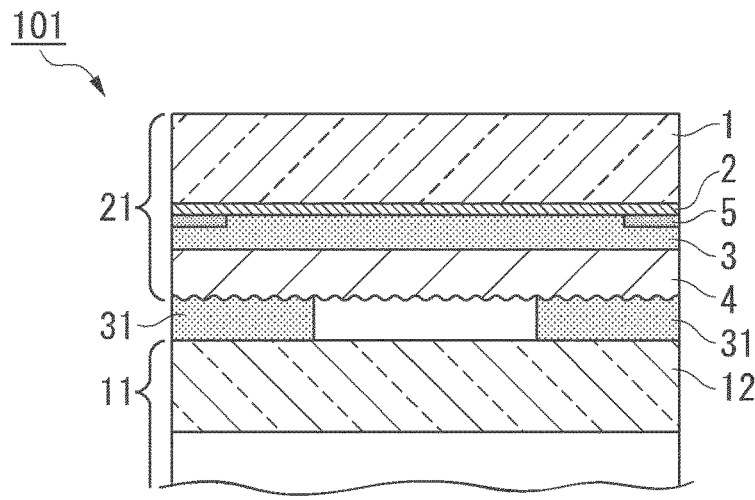
FIG. 1 is a schematic cross-sectional view showing a configuration of a display device with a capacitive touch panel according to a first embodiment of the invention.

FIG. 1 is a schematic cross-sectional view showing a configuration of a display device 101 with a capacitive touch panel according to this embodiment.

The display device 101 with a capacitive touch panel includes a liquid crystal display 11 having a polarizing plate 12 disposed on a top surface thereof, and a capacitive touch panel (hereinafter, simply referred to as "touch panel") 21. The touch panel 21 is disposed over a front surface of the liquid crystal display 11 such that a gap is provided between the touch panel 21 and the polarizing plate 12, and the outer edge thereof is fixed to the liquid crystal display 11 via an adhesive layer 31. Accordingly, a space is formed between the front surface of the liquid crystal display 11 and the back surface of the touch panel 21.

The outer edge mainly indicates a portion on which frame printing is performed when the display device with a capacitive touch panel is assembled.

The touch panel 21 includes a transparent substrate 1, a conductive layer 2 provided on a back surface of the transparent substrate 1 (on the side of the liquid crystal display 11), and a protective sheet 4 laminated on the conductive layer 2 via an adhesive layer 3, and a printing layer 5 is formed in an outer edge of a back surface of the conductive layer 2.

A surface of the protective sheet 4, opposed to the liquid crystal display 11, is an irregular surface having minute irregularities, and the irregular surface has a surface roughness of 1.5 nm to 400 nm.

In the present specification and claims, the term "front surface" means a surface on the side on which user's visual recognition or operation is made when using the capacitive touch panel or the display device having the capacitive touch panel attached thereto, and the term "back surface" means a surface on the opposite side to the side on which user's visual recognition or operation is made. The front surface of the touch panel may be referred to as a touch surface.

In the present specification and claims, the term "surface roughness" indicates arithmetic mean roughness.

[Liquid Crystal Display 11]

The liquid crystal display 11 is not particularly limited, and known liquid crystal displays can be used.

[Touch Panel 21]

(Transparent Substrate 1)

Known transparent substrates which are used in touch panels and the like can be used as the transparent substrate 1.

The transparent substrate 1 is not particularly limited so long as it is made of a material having a predetermined or greater strength. The transparent substrate 1 is preferably made of polyethylene terephthalate (PET), polycarbonate (PC), polymethyl methacrylate (PMMA), polyethylenenaphthalate (PEN), polyethersulfone (PES), cyclic olefin polymer (COC, COP), a triacetylcellulose (TAC) film, a polyvinyl alcohol (PVA) film, a polyimide (PI) film, polystyrene (PS), biaxially oriented polystyrene (containing K resin, biaxially oriented PS; BOPS), glass, tempered glass, or the like. Since the conductive layer 2 is formed on one surface of the transparent substrate 1, a high frequency treatment, a primer treatment or the like may be performed on one surface of the transparent substrate 1 in order to improve an adhesive strength between the transparent substrate 1 and the conductive layer 2, thereby forming a surface-treated layer.

The thickness of the transparent electrode 1 is preferably 0.1 mm or greater, and more preferably 0.2 mm or greater. When the thickness is 0.1 mm or greater, the touch panel 11 has a sufficient strength. The upper limit is not particularly limited. However, when the thickness is greater than 3 mm, bending or distortion is less likely to occur and Newton's rings is also less likely to occur, and thus the upper limit is preferably 3 mm or less, and more preferably 2 mm or less in view of usefulness of the invention and excellent transparency.

The range of the thickness of the transparent substrate 1 is preferably 0.1 mm to 3 mm, and more preferably 0.2 mm to 2 mm.

(Conductive Layer 2)

The conductive layer 2 is a conductive film formed on the insulating transparent substrate 1.

The conductive layer 2 may be: a uniform layer which is used in surface type capacitive touch panels and the like and has substantially uniform conductive performance in an in-plane direction on the transparent substrate 1; or a conductive layer which is used in projection type capacitive touch panels and the like, has an insulating portion for position detection in a part of a surface thereof, and has conductive performance patterned regularly.

A protective film for preventing oxidation of the conductive film may be further formed on the conductive layer.

The conductive performance of the conductive layer can be expressed in terms of surface resistance which is measured using, for example, the method described in JIS-K7194, and the surface resistance is preferably $1\times10^5$ Ω/sq or less, and more preferably $1\times10^3$ Ω/sq or less in order to make the conductive layer serve as an electrode plate for the touch panel. In addition, the surface resistance is preferably 1 Ω/sq or greater, and more preferably $1\times10^2$ Ω/sq or greater. The range of the surface resistance of the conductive layer is preferably 1 Ω/sq to $1\times10^5$ Ω/sq, and more preferably $1\times10^2$ Ω/sq to $1\times10^3$ Ω/sq.

For more accurate position detection by the touch panel, the insulating portion may be properly insulated so that for example, the surface resistance measured using the method described in JIS-K6911 is preferably $1\times10^9$ Ω/sq or greater, and more preferably $1\times10^{11}$ Ω/sq or greater, and is preferably $1\times10^{13}$ Ω/sq or less, and more preferably $1\times10^{12}$ Ω/sq or less. The range of the surface resistance of the insulating portion is preferably $1\times10^9$ Ω/sq to $1\times10^{13}$ Ω/sq, and more preferably $1\times10^{11}$ Ω/sq to $1\times10^{12}$ Ω/sq.

When a substantially uniform conductive layer is applied, a part in the vicinity of the outer circumference of the conductive layer 2 may also be patterned to form an extraction electrode and the like according to the configuration and the like of the touch panel.

Known conductive substances can be applied as the material of the conductive layer 2. As the conductive substance, an inorganic material may be used, and examples of the inorganic material include metals such as gold, silver, copper, aluminum, nickel, or cobalt, or metal oxides such as indium-tin oxide (ITO), indium-zinc oxide (IZO), zinc oxide (ZnO), or zinc-tin oxide (ZTO), or antimony-tin oxide (ATO). As the conductive substance, an organic conductive material may be used, and examples of the organic conductive material include, but are not limited to, conductive carbon materials such as conductive carbon nanotube and grapheme, and conductive polymers such as polythiophene and polyaniline.

Among these, ITO is most preferably used as the inorganic material in view of high reliability and excellent transparency and conductivity. PEDOT/PSS as a type of polythiophene which is an organic conductive polymer is also preferably used in view of the fact that it has excellent bendability, transparency and conductivity. The PEDOT/PSS indicates a polymer complex in which PEDOT (a polymer of 3,4-ethylene dioxythiophene) and PSS (a polymer of styrenesulfonic acid) exist together.

Compared to the conductive materials such as ITO and PEDOT/PSS having relatively excellent transparency, the metals and the conductive carbon materials are less transparent. Accordingly, when a metal or a conductive carbon material is used as the material of the conductive layer 2, the metal or the conductive carbon material to be used may be formed into a nanowire and subjected to coating, or may be processed into a mesh to secure transparency. Among these, silver is preferably used since it is the conductive material having the best conductivity.

The thickness of the conductive layer 2 is required to be set in consideration of the conductivity and the transparency of the conductive material to be applied. For example, the thickness is preferably 30 Å to 600 Å when a metal material is used, and is preferably 80 Å to 5000 Å when a metal oxide or organic material is used.

The conductive layer 2 can be formed using known methods.

For example, when the conductive layer 2 is a uniform layer, examples of the method include thin film forming methods such as a vacuum deposition method, a sputtering method, an ion plating method, a spray pyrolysis method, a chemical plating method, an electroplating method, a coating method, and combinations thereof. A vacuum deposition method or a sputtering method is preferably used in view of a film forming rate, formability of a large-area film, or productivity.

The regular pattern may be formed using a method of providing a part of the conductive layer 2 in advance on the transparent substrate 1 using various printing methods and the like, or may be formed by forming a uniform layer as described above and by then removing a part of the layer through etching or the like.

Prior to the formation of the conductive layer 2, an appropriate pretreatment such as a corona discharge treatment, an ultraviolet irradiation treatment, a plasma treatment, a sputter etching treatment, or an undercoating treatment may be performed on the surface of the transparent substrate 1 to increase the adhesion.

(Adhesive Layers 3 and 31)

As adhesives constituting the adhesive layers 3 and 31, known adhesives which are used for optical applications such as touch panels can be used, and examples thereof include natural rubber adhesives, synthetic rubber adhesives, acrylic adhesives, urethane adhesives, or silicone adhesives. The adhesives may be any of solvent adhesives, solventless adhesives, emulsion adhesives, or aqueous adhesives. Among these, acrylic adhesives, especially solvent adhesives are preferred from the viewpoint of transparency, weather resistance, durability, or cost.

If desired, other auxiliary agents may be added to the adhesive. Examples of other auxiliary agents include antioxidants, tackifiers, silane coupling agents, ultraviolet absorbers, light stabilizers such as a hindered amine compound, thickeners, pH adjusters, binders, crosslinking agents, adhesive particles, antifoaming agents, antiseptic/mildewproofing agents, pigments, inorganic fillers, stabilizers, wetting agents, or moistening agents.

The thickness of each of the adhesive layers 3 and 31 is preferably 1 μm to 100 μm, and more preferably 20 μm to 80 μm. When the thickness is 1 μm or greater, sufficient adhesiveness is obtained. In addition, it is possible to make up for the difference in level thereof when the printing layer 5 exists. When the thickness of the adhesive layer 3 is greater than 100 μm, the thickness is disadvantageous in view of a reduction in thickness or cost.

The thicknesses of the adhesive layers 3 and 31 can be measured using the method based on JIS-K7130.

(Protective Sheet 4)

The surface of the protective sheet 4, opposed to the liquid crystal display 11, is an irregular surface having minute irregularities, and the irregular surface has a surface roughness of 1.5 nm to 400 nm.

When the surface opposed to the liquid crystal display 11 is an irregular surface having a surface roughness of 1.5 nm or greater, the contact area when the transparent substrate 1 is bent in the direction of the liquid crystal display 11 and brought into contact with the front surface of the polarizing plate 12 opposed thereto is smaller than in the case in which the surface opposed to the liquid crystal display 11 has no or only small irregularities, and thus separation easily occurs. Accordingly, an excellent anti-Newton ring effect is exhibited, and the adhesion to the polarizing plate 12 can be prevented or reduced. The surface roughness is preferably 2 nm or greater, and more preferably 3 nm or greater.

When the surface roughness is 400 nm or less, the size of the protective sheet 4 is reduced and transparency increases. Accordingly, brightness of the touch surface is hardly deteriorated. The surface roughness is preferably 200 nm or less, and more preferably 100 nm or less.

The range of the surface roughness of the protective sheet 4 is preferably 2 nm to 380 nm, and more preferably 3 nm to 350 nm.

The surface roughness of 1.5 nm to 400 nm is smaller than that of a conventional anti-Newton ring film, and thus it is thought that the anti-Newton ring effect is not obtained. However, in the invention, a sufficient anti-Newton ring effect is obtained. The reason is thought to be that since the base material of the touch panel is a transparent substrate and has a certain degree of strength, bending or distortion is easily corrected so long as there is no strong adhesion to the opposed surface.

Figure 2:
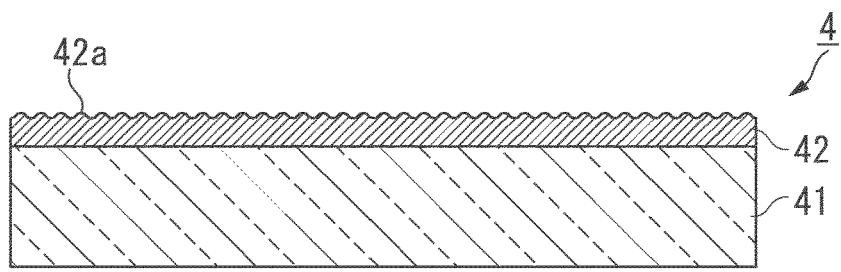
FIG. 2 is a schematic cross-sectional view showing an example of a protective sheet used in the invention.

FIG. 2 shows a schematic cross-sectional view showing a configuration of the protective sheet 4 used in this embodiment.

The protective sheet 4 is composed of a base material 41 and a hard coating layer 42 provided on one surface of the base material 41. A surface of the hard coating layer 42 on the opposite side to the base material 41 is an irregular surface 42a having irregularities, and the irregular surface 42a has a surface roughness of 1.5 nm to 400 nm. The protective sheet 4 is disposed so that a side thereof on the side of the base material 41 is toward the transparent substrate 1.

The range of the surface roughness of the irregular surface 42a is preferably 2 nm to 380 nm, and more preferably 3 nm to 350 nm.

Examples of the base material 41 include a polyethylene terephthalate film, a polyethylene naphthalate film, a polypropylene terephthalate film, a polybutylene terephthalate film, a polypropylene naphthalate film, a polyethylene film, a polypropylene film, cellophane, a diacetyl cellulose film, a triacetyl cellulose film, an acetylcellulose butylate film, a polyvinyl chloride film, a polyvinylidene chloride film, a polyvinyl alcohol film, an ethylene-vinyl acetate copolymer film, a cycloolefin copolymer film, a cycloolefin polymer film, a polystyrene film, a polycarbonate film, a polymethylpentene film, a polysulfone film, a polyetheretherketone film, a polyethersulfone film, a polyether imide film, a polyimide film, a fluororesin film, a polyamide film, or an acrylic resin film.

A polyethylene terephthalate film is particularly preferred from the viewpoint of transparency, weather resistance, solvent resistance, stiffness, or cost.

The base material 41 may contain various additives. Examples of the additives include antioxidants, heat-resistive stabilizers, ultraviolet absorbers, organic particles, inorganic particles, pigments, dyes, antistatic agents, nucleating agents, or coupling agents.

The base material 41 may be subjected to a surface treatment to improve the adhesion to the hard coating layer 42. Examples of the surface treatment include a roughening treatment such as a sand blast treatment and a solvent treatment, a corona discharge treatment, a chromic acid treatment, a flame treatment, a hot air treatment, or a surface oxidation treatment such as an ozone or ultraviolet irradiation treatment.

The thickness of the base material 41 is preferably 10 μm to 300 μm, more preferably 30 μm to 200 μm, and particularly preferably 35 μm to 130 μm from the viewpoint of securing the strength or preventing curling.

The thickness of the base material 41 can be measured using the method based on JIS-K7130.

The hard coating layer 42 is provided to give scratch resistance. In addition, in this embodiment, the surface 42a on the opposite side to the base material 41 is an irregular surface having a predetermined surface roughness, and anti-Newton ring performance is thus exhibited.

Conventionally, as a method of forming such a hard coating layer having an irregular surface, known methods which are used to form minute irregularities on a surface of a film in order to prevent blocking can be used. In general, the hard coating layer is formed by coating a base material with a hard coating layer forming coating liquid containing a thermosetting or active energy ray curable resin component to form a coating film, and by then curing the coating film. Specific examples of the method of forming irregularities include a method of blending particles in a hard coating layer forming material, or a method of including two or more resin components having different solubility parameter (SP) values in a hard coating layer forming material to precipitate one resin component through phase separation after coating.

In the method of blending particles in a hard coating layer forming material, the surface roughness can be easily adjusted according to a particle diameter of the particles or the amount of the particles to be added. Since the method of containing two or more resin components having different SP values to form irregularities through phase separation uses no particles, quality stability when the coating is performed for a long time is excellent without depending on dispersion stability of the particles. The method of blending particles and the method of forming irregularities through phase separation are appropriately used according to the use or purpose, and can also be used in combination in some cases.

Examples of the thermosetting resin component include phenolic resins, urea resins, diallyl phthalate resins, melamine resins, unsaturated polyester resins, polyurethane resins, epoxy resins, aminoalkyd resins, silicon resins, or polysiloxane resins.

Examples of the active energy ray curable resin component include a resin component containing a monomer having a polymerizable unsaturated group (for example, a group having a polymerizable unsaturated bond such as an ethylenic double bond) which is polymerizable by irradiation of active energy rays. If desired, a photopolymerization initiator and the like are blended in the active energy ray curable resin component.

The hard coating layer 42 is particularly preferably a cured material obtained by curing a hard coating layer forming composition containing a multifunctional (meth) acrylic monomer and particles (hereinafter, referred to as hard coating layer forming composition (A)) using active energy rays. In addition, if necessary, a monofunctional (meth)acrylic monomer can be used. Such a cured material has excellent surface hardness, transparency, or scratch resistance since a parent material (a portion excluding the particles) contains a hard acrylic polymer having a cross-linked structure. In addition, since the particles are contained, a surface of the hard coating layer 42 to be formed, on the opposite side to the base material 41, becomes an irregular surface, and contraction during the curing is suppressed.

The term "multifunctional" means that two or more polymerizable unsaturated groups are contained, and the "(meth)acrylic monomer" is a compound having at least a (meth)acryloyl group as a polymerizable unsaturated group. The "(meth)acryloyl group" indicates an acryloyl group or a methacryloyl group.

Examples of the multifunctional (meth)acrylic monomer include bifunctional (meth)acrylates such as dipropylene glycol di(meth)acrylate, tripropylene glycol di(meth)acrylate, 1,4-butanediol di(meth)acrylate, 1,6-hexaonediol di(meth)acrylate, neopentyl glycol di(meth)acrylate, propylene oxide-modified neopentyl glycol di(meth)acrylate, neopentyl glycol adipate di(meth)acrylate, hydroxy pi vali c acid neopently glycol di(meth)acrylate, dicyclopentanyl di(meth)acrylate, caprolactone-modified dicyclopentenyl di(meth)acrylate, polyethylene glycol (mass average molecular weight: preferably 400 to 600) di(meth)acrylate, modified bisphenol A di(meth)acrylate, tricyclodecane dimetanol di(meth)acrylate, ethylene oxide-modified phosphoric acid di(meth)acrylate, allylated cyclohexyl di(meth) acrylate, or isocyanurate di(meth)acrylate; trifunctional (meth)acrylates such as pentaerythritol tri(meth)acrylate, dipentaerythritol tri(meth)acrylate, propionic acid-modified dipentaerythritol tri(meth)acrylate, trimethylol propane tri (meth)acrylate, trimethylol propane ethyoxy tri(meth)acrylate, ethylene oxide-modified trimethylol propane tri(meth) acrylate, propylene oxide-modified trimethylol propane tri (meth)acrylate, polyether tri(meth)acrylate, glycerin propoxy tri(meth)acrylate, or tris(acryloxyethyl)isocyanurate; tetrafunctional (meth)acrylates such as pentaerythritol tetra(meth)acrylate, pentaerythritol ethoxy tetra(meth)acrylate, ditrimethylolpropane tetra(meth)acrylate, or pentaerythritol triacrylate; or pentafunctional or higher functional (meth)acrylates such as dipentaerythritol penta(meth) acrylate, propionic acid-modified dipentaerythritol penta (meth)acrylate, dipentaerythritol monohydroxy penta(meth) acrylate, dipentaerythritol hexa(meth)acrylate, or caprolactone-modified dipentaerythritol hexa(meth)acrylate.

These multifunctional (meth)acrylic monomers may be used singly or in combination of two or more types thereof.

The term "monofunctional" means that one polymerizable unsaturated group is contained. Examples of the monofunctional (meth)acrylic monomer include methyl (meth) acrylate, ethyl (meth)acrylate, propyl (meth)acrylate, butyl (meth)acrylate, 2-ethylhexyl (meth)acrylate, isodecyl (meth)acrylate, lauryl (meth)acrylate, stearyl (meth)acrylate, allyl (meth)acrylate, cyclohexyl (meth)acrylate, methylcyclohexyl (meth)acrylate, isobornyl (meth)acrylate, 2-hydroxyethyl (meth)acrylate, 2-hydroxypropyl (meth) acrylate, glycerol (meth)acrylate, glycidyl (meth)acrylate, benzil (meth)acrylate, 2-ethoxyethyl (meth)acrylate, 2-(2-ethoxyethoxy)ethyl (meth)acrylate, butoxyethyl (meth)acrylate, 2-methoxyethyl (meth)acrylate, methoxydiethylene glycol (meth)acrylate, methoxytriethylene glycol (meth) acrylate, methoxypolyethylene glycol (meth)acrylate, 2-methoxypropyl (meth)acrylate, methoxydipropylene glycol (meth)acrylate, methoxytripropylene glycol (meth)acrylate, methoxypolypropylene glycol (meth)acrylate, polyethylene glycol (meth)acrylate, or polypropylene glycol (meth) acrylate. These monofunctional (meth)acrylic monomers may be used singly or in combination of two or more types thereof The multifunctional (meth)acrylic monomer preferably contains a tetrafunctional or higher functional (preferably pentafunctional or higher functional) (meth)acrylic monomer and bi- or trifunctional (meth)acrylic monomer. The tetrafunctional or higher functional (meth)acrylic monomer contributes to an improvement in the hardness, and the bi- or trifunctional (meth)acrylic monomer contributes to an improvement in flexibility. Therefore, a hard coating layer which is obtained by using these in combination has high hardness and appropriate flexibility. The monofunctional (meth)acrylic monomer contributes to an improvement in flexibility. In addition, it can also be used to adjust the viscosity of a coating agent because of the low viscosity thereof.

A proportion of the tetrafunctional or higher functional (meth)acrylic monomer in all of the multifunctional (meth) acrylic monomers is preferably 50 mass % to less than 95 mass %, and more preferably 60 mass % to less than 90 mass % with respect to the total mass of all the (meth)acrylic monomers. The proportion of the bi- or trifunctional (meth) acrylic monomer is preferably 5 mass % to less than 50 mass %, and more preferably 10 mass % to less than 40 mass % with respect to the total mass of all the (meth)acrylic monomers. A proportion of the monofunctional (meth) acrylic monomer is preferably 1 mass % to less than 50 mass %, and more preferably 5 mass % to less than 30 mass % with respect to the total mass of all the (meth)acrylic monomers.

Examples of the bi- or trifunctional (meth)acrylic monomer include diethylene glycol diacrylate.

Examples of the tetrafunctional or higher functional (meth)acrylic monomer include dipentaerythritol hexaacrylate.

The hard coating layer forming composition (A) may be a mixture of at least two different compositions. The mixture is preferably a mixture of a composition (A1) containing a multifunctional (meth)acrylic monomer (a1) or a monofunctional (meth)acrylic monomer (a2) and a composition (B1) containing a multifunctional (meth)acrylic monomer (b1) or a monofunctional (meth)acrylic monomer (b2). The multifunctional (meth)acrylic monomers or the monofunctional (meth)acrylic monomers may be used singly or in combination of two or more types thereof. In addition, before mixing of two or more different compositions, the multifunctional (meth)acrylic monomer or the monofunctional (meth)acrylic monomer may be polymerized. As the multifunctional (meth)acrylic monomer, pentaerythritol triacrylate or dipentaerythritol hexaacrylate is preferred. As the monofunctional monomer, cyclohexyl methacrylate, n-butyl methacrylate, methyl methacrylate, or isobornyl methacrylate is preferred.

The hard coating layer forming composition (A) may use a resin containing an olefin resin, a polyether resin, a polyester resin, a polyurethane resin, a polystyrene resin, a polysiloxane resin, a polysilane resin, a polyimide resin, or a fluororesin in a skeleton structure, if necessary. These resins may be so-called oligomers having a low molecular weight. Examples of the resin containing an olefin resin in a skeleton structure, as a multifunctional monomer, include polyethylene, polypropylene, ethylene-propylene copolymer, ethylene-vinyl acetate copolymer, ionomer, ethylene-vinyl alcohol copolymer, or ethylene-vinyl chloride copolymer. The resin containing a polyether resin in a skeleton structure is a resin containing an ether bond in a molecular chain, and examples thereof include polyethylene glycol, polypropylene glycol, or polytetramethylene glycol. The resin containing a polyester resin in a skeleton structure is a resin containing an ester bond in a molecular chain, and examples thereof include an unsaturated polyester resin, an alkyd resin, or polyethylene terephthalate. The resin containing a polyurethane resin in a skeleton structure is a resin containing an urethane bond in a molecular chain. The resin containing a polysiloxane resin in a skeleton structure is a resin containing a siloxane bond in a molecular chain. The resin containing a polysilane resin in a skeleton structure is a resin containing a silane bond in a molecular chain. The resin containing a polyimide resin in a skeleton structure is a resin containing an imide bond in a molecular chain. The resin containing a fluororesin in a skeleton structure is a resin having a structure in which a part or all of the hydrogen of polyethylene is substituted with fluorine.

The particles contained in the hard coating layer forming composition (A) may be inorganic or organic particles.

The inorganic particles preferably has high hardness, and for example, inorganic oxide particles such as silicon dioxide particles, titanium dioxide particles, zirconium oxide particles, aluminum oxide particles, tin dioxide particles, antimony pentoxide particles, or antimony trioxide particles can be used.

The inorganic particles may be reactive inorganic oxide particles obtained by treating the inorganic oxide particles using a coupling agent. By virtue of the treatment using a coupling agent, a bonding force between the inorganic particles and the acrylic polymer can be increased. As a result, surface hardness and scratch resistance can be improved, and dispersibility of the inorganic oxide particles can be improved.

Examples of the coupling agent include γ-aminopropyltriethoxysilane, γ-aminopropyltrimethoxysilane, γ-glycidoxypropyltriethoxysilane, γ-glycidoxypropyltrimethoxysilane, γ-mercaptopropyltrimethoxysilane, γ-aminopropyltriethoxysilane, or γ-aminopropyltriethoxy aluminum. These may be used singly or in combination of two or more types thereof The amount of the coupling agent used in the treatment is preferably 0.1 parts by mass to 20 parts by mass, and more preferably 1 part by mass to 10 parts by mass with respect to 100 parts by mass of the inorganic oxide particles.

As the organic particles, for example, resin particles such as acrylic resin, polystyrene, polysiloxane, melamine resin, benzoguanamine resin, polytetrafluoroethylene, cellulose acetate, polycarbonate, or polyamide can be used.

The organic particles may be reactive resin particles obtained by treating the resin particles using a coupling agent. By virtue of the treatment using a coupling agent, a bonding force between the organic particles and the acrylic polymer can be increased. As a result, surface hardness and scratch resistance can be improved, and dispersibility of the resin particles can be improved.

The coupling agent and the amount thereof used in the treatment are the same as those exemplified in the case of the reactive inorganic oxide particles.

The particle diameter of the particles may be set in consideration of a desired surface roughness or a thickness of the hard coating layer to be formed, and is not particularly limited. In general, the particle diameter is in the range of 10 nm to 10 µm, and preferably 30 nm to 5 µm. The larger the particle diameter, the greater the surface roughness.

Regarding the particle diameter, a maximum length of a particle image (Dmax: a maximum length between two points on the contour of the particle image) and a maximum perpendicular length (DV-max: when the particle image is interposed between two straight lines parallel to the maximum length, a minimum length between the two straight lines) are measured using a transmission electron microscope, and a geometric mean value $(Dmax \times DV\text{-}max)^{1/2}$ is set as the particle diameter. Particle diameters of 100 particles are measured using this method, and a calculated mean value thereof is set as a mean particle diameter.

The amount of the particles to be blended is preferably 1 mass % to 30 mass %, and more preferably 2 mass % to 10 mass % with respect to, in the case in which the solid content of the hard coating layer forming composition (A) includes no solvent, the mass of all of the components constituting the hard coating layer forming composition (A), and in the case in which the solid content includes a solvent, the mass of all of the components excluding the solvent. There is a tendency that the larger the amount of the particles to be blended, the greater the surface roughness, and when the above range is satisfied, a desired surface roughness is easily obtained. In addition, when the amount of the particles to be blended is 1 mass % or greater, the anti-Newton ring property is improved, and when the amount of the particles to be blended is 30 mass % or less, the multifunctional (meth)acrylic monomer can be blended in a sufficient amount, whereby superior hard coating performance is obtained.

The solid content indicates, in the case in which no solvent is included, a total of all of the components constituting the hard coating layer forming composition (A), and in the case in which a solvent is included, a total of all of the components excluding the solvent.

In order to promote hardening, the hard coating layer forming composition (A) preferably contains a photopolymerization initiator together with the multifunctional (meth) acrylic monomer and the particles.

As the photopolymerization initiator, known initiators can be used, and examples thereof include benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenyl acetophenone, 2,2-diethoxy-2-phenyl acetophenone, 2-hydroxy-2-methyl-1-phenylpropane-1-on, 1-hydroxycyclohexyl phenyl ketone, 2-methyl-1-[4-(methylthio)phenyl]-2-morpholino-propane-1-on, 4-(2-hydroxyethoxy)phenyl-2 (hydroxy-2-propyl)-ketone, benzophenone, or p-phenylbenzophenone, 4,4'-diethylaminobenzophenone, propiophenone, dichlorobenzophenone, 2-methyl anthraquinone, 2-ethyl anthraquinone, 2-tertiary butyl anthraquinone, 2-aminoanthraquinone, 2-methyl thioxanthone, 2-ethyl thioxanthone, 2-chlorothioxanthone, 2,4-dimethyl thioxanthone, 2,4-diethyl thioxanthone, benzyl dimethyl ketal, acetophenone dimethyl ketal, or p-dimethylamine benzoic acid ester. The photopolymerization initiators may be used singly or in combination of two or more types thereof The amount of the photopolymerization initiator to be blended is preferably 0.5 mass % to 10 mass %, and more preferably 2 mass % to 8 mass % with respect to, in the case in which the solid content of the hard coating layer forming composition (A) includes no solvent, the mass of all of the components constituting the hard coating layer forming composition (A), and in the case in which the solid content includes a solvent, the mass of all of the components excluding the solvent. When the amount is 0.5 mass % or greater, incomplete hardening is less likely to occur. When the amount to be blended is greater than 10 mass %, a hardening promotion effect corresponding to the amount to be blended is not obtained and the cost is also increased. In addition, the photopolymerization initiator may remain in the cured material, and thus cause yellowing, bleeding out, or the like.

In addition to the photopolymerization initiator, a photosensitizer may be further contained. Examples of the photosensitizer include n-butylamine, triethylamine, or tri-n-butylphosphine.

If desired, the hard coating layer forming composition (A) may contain a component other than the above-described components so long as the effects of the invention are not damaged. For example, a known additive which is used to give a function (water repellency, oil repellency, antifouling property, antistatic property, or ultraviolet shielding property) other than scratch resistance to the hard coating layer may be contained. Examples of the additive include fluorine compounds, polysiloxane compounds, metal oxide fine particles, antistatic resins, conductive polymers, or ultraviolet absorbers. By adding a fluorine compound, it is possible to give water or oil repellency and an antifouling effect in which dirt is difficult to adhere and adhered dirt is easily wiped off. By adding a polysiloxane compound, it is possible to give water repellency and an antifouling effect in which dirt is difficult to adhere and adhered dirt is easily wiped off. By adding metal oxide fine particles, an antistatic resin, or a conductive polymer, it is possible to give an antistatic property. By adding metal oxide fine particles or an ultraviolet absorber, it is possible to provide an ultraviolet shielding property.

The hard coating layer forming composition (A) may contain a solvent.

Examples of the solvent include methanol, ethanol, isopropanol, acetone, methyl ethyl ketone, toluene, n-hexane, n-butyl alcohol, methyl isobutyl ketone, methyl butyl ketone, ethyl butyl ketone, cyclohexanone, ethyl acetate, butyl acetate, propylene glycol monomethyl ether acetate, ethylene glycol monoethyl ether, propylene glycol monomethyl ether, and N-methyl-2-pyrrolidone. These may be used singly or in combination of two or more types thereof.

Two or more types of solvents having different evaporation rates are particularly preferably used in combination since coating unevenness can be reduced. For example, at least two types of solvents selected from the group consisting of methyl ethyl ketone, methyl isobutyl ketone, ethyl acetate, butyl acetate, and propylene glycol monomethyl ether are preferably mixed and used.

The hard coating layer 42 can be formed by coating the base material 41 with a hard coating layer forming material such as the hard coating layer forming composition (A) to form a coating film, and by then curing the coating film.

Examples of the coating method using the hard coating layer forming material include methods using a blade coater, an air knife coater, a roll coater, a bar coater, a gravure coater, a micro gravure coater, a rod-blade coater, a lip coater, a die coater, a curtain coater, or a printing machine.

The amount of the hard coating layer forming material to be coated is set according to the thickness of the hard coating layer 42 to be formed.

The thickness of the hard coating layer 42 is preferably 1 μm to 10 μm, and more preferably 2 μm to 8 μm. When the thickness is 1 μm or greater, sufficient hard coating performance is obtained. When the thickness is 10 μm or less, a hard coating layer 42 is excellent in transparency, adhesion of the base material, curling resistance or the like.

The thickness of a thinnest portion of the hard coating layer 42 (the distance from the bottom of a recessed portion present in the irregular surface 42a to the surface on the side of the base material 41) is set as the thickness of the hard coating layer 42.

The thickness of the hard coating layer 42 can be measured using the method based on JIS-K7130.

The coating film can be cured by irradiation of active energy rays when the hard coating layer forming material is an active energy ray curable material such as the hard coating layer forming composition (A). When the hard coating layer forming material is a thermosetting material, the coating film can be cured by heating using a heating furnace, an infrared lamp, or the like.

Examples of the active energy rays include ultraviolet rays, electron rays, visible rays, or ionizing radial rays such as γ-rays, and among these, ultraviolet rays are preferred in view of general purpose usability. As an ultraviolet source, for example, a high pressure mercury lamp, a low pressure mercury lamp, an ultrahigh pressure mercury lamp, a metal halide lamp, a carbon arc, a xenon arc, or an electrodeless ultraviolet lamp, or the like can be used.

As the electron rays, for example, electron rays emitted from various electron ray accelerators such as a Cockroft-Walton accelerator, a Van de Graaff accelerator, a resonance transformer accelerator, an insulated core transformer accelerator, a linear accelerator, a dynamitoron accelerator, or a high frequency accelerator can be used.

The curing by irradiation of active energy rays is preferably performed under the presence of inert gas such as nitrogen.

The curing may be performed in one stage or in two stages of a precuring process and a main curing process.

The protective sheet 4 preferably has a total light transmittance greater than 90% and a haze less than 1%. It is useful as a protective sheet for a touch panel or a display device when these requirements are satisfied.

The total light transmittance and the haze can be measured using the methods based on JIS-K7361-1 and JIS-K7136, respectively.

In the protective sheet 4, a water contact angle of the surface 42a on the side of the hard coating layer 42 (on the opposite side to the base material 41) is preferably 105° or less, more preferably 90° or less, and even more preferably 85° or less. Accordingly, when the polarizing plate 12 is stuck to the surface 42a of the protective sheet 4 on the side of the hard coating layer 42 via the adhesive layer 31, an excellent adhesion strength is obtained.

The water contact angle of the surface 42a is preferably 5° or greater from the viewpoint of easy control, and more preferably 50° or greater from the viewpoint of printing and processing suitability such as a recoating property.

The range of the water contact angle of the surface 42a is preferably 5° to 105°, more preferably 50° to 90°, and even more preferably 55° to 85°.

The water contact angle can be measured through a method in which using a contact angle measuring device, a droplet of 2 μL of pure water is dripped to the surface 42a on the side of the hard coating layer 42 in the protective sheet 4, and a droplet shape after 10 seconds from the dripping is photographed by a CCD camera to perform an image process.

The water contact angle of the surface 42a can be adjusted according to the material constituting the hard coating layer 42, the manufacturing method, or the like. For example, the smaller the amount of a leveling agent to be blended, the smaller the water contact angle.

The protective sheet used in the invention is not limited to the above-described protective sheet 4. For example, a second hard coating layer may be provided on a surface of the base material 41 on the opposite side to the side on which the hard coating layer 42 is provided. In this case, a surface on the opposite side to the base material side of the second hard coating layer may have or may not have irregularities.

In addition, if desired, the protective sheet may have a functional layer other than the hard coating layer. Examples of the functional layer other than the hard coating layer include functional layers such as an antireflection layer, a conductive layer, a hard coating protective layer, an antidazzle layer, a refractive index adjustment layer (medium refractive index layer), an easily adhesive layer, an antistatic layer, or an ultraviolet shielding layer. These functional layers can be formed using known methods.

These functional layers may be provided on the opposite side to the base material side of the hard coating layer, or provided between the base material and the hard coating layer.

When the functional layer is provided on the opposite side to the base material side, the surface roughness of the functional layer on the opposite side to the base material side is required to be 1.5 nm to 400 nm.

Figure 3:
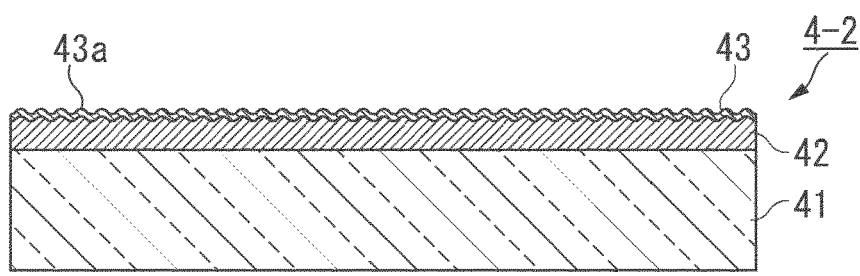
FIG. 3 is a schematic cross-sectional view showing a modified example of the protective sheet shown in FIG. 2.
Figure 4:
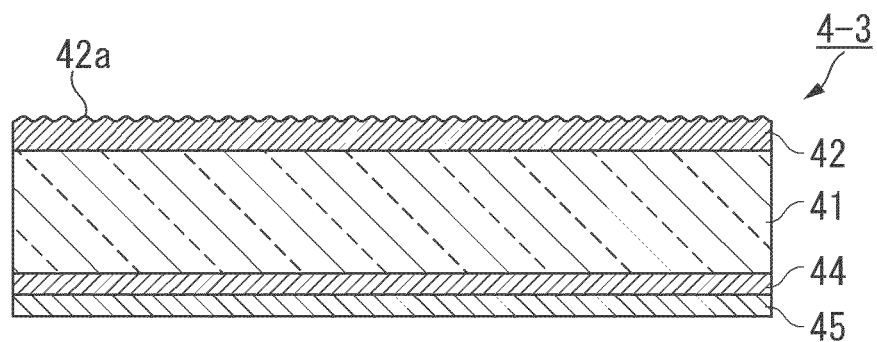
FIG. 4 is a schematic cross-sectional view showing a modified example of the protective sheet shown in FIG. 2.
Figure 5:
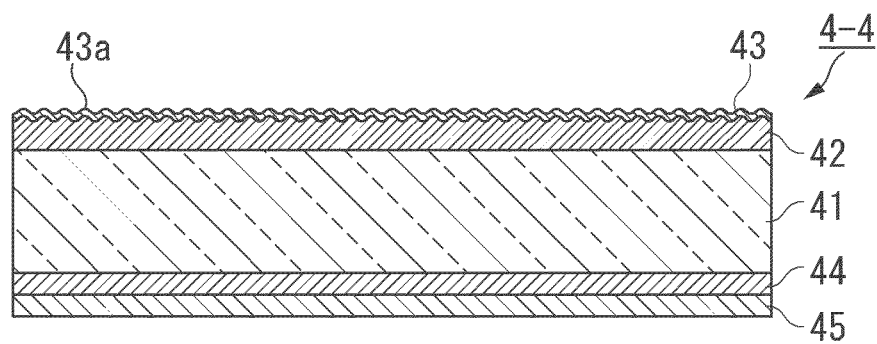
FIG. 5 is a schematic cross-sectional view showing a modified example of the protective sheet shown in FIG. 2.

FIGS. 3 to 5 show modified examples of the protective sheet 4.

In the protective sheet shown in FIG. 3 (hereinafter, protective sheet 4-2), an antireflection layer 43 is further provided on the hard coating layer 42 of the protective sheet 4.

Due to the formation on the irregular surface of the hard coating layer 42, the antireflection layer 43 reflects the shape of the irregular surface, and thus a surface of the antireflection layer 43 on the opposite side to the base material 7 also has irregularities (irregular surface 43a). The surface roughness of the irregular surface 43a of the antireflection layer 43 is 1.5 nm to 400 nm.

The surface roughness of the irregular surface 43a of the antireflection layer 43 is preferably 2 nm to 380 nm, and more preferably 3 nm to 350 nm.

The antireflection layer 43 is a layer having a low refractive index, and serves to suppress light reflection from the antireflection layer 43 of the protective sheet 4-2 and to increase light permeability. In the case of glass, a crystalline material, plastic, or the like, approximately several percentages of reflected light is generated on a surface thereof with respect to incident light. However, the protective sheet 4-2 reduces surface reflection and increases the transmittance by virtue of the antireflection layer 43.

The thickness of the antireflection layer 43 is preferably 50 nm to 150 nm, and more preferably 60 nm to 140 nm. When the thickness of the antireflection layer 43 is 50 nm or greater, an antireflection effect by light interference is easily obtained. When the thickness of the antireflection layer 43 is 150 nm or less, the adhesion to the hard coating layer 42 is superior.

The thickness of the antireflection layer 43 can be measured using a spectral interference film thickness meter.

The refractive index of the antireflection layer 43 is preferably 1.25 to 1.45, and more preferably 1.30 to 1.40 since the light reflection is easily suppressed. The refractive index of the antireflection layer 43 can be adjusted according to the material constituting the antireflection layer 43.

The antireflection layer 43 is preferably a layer containing an inorganic silicon-containing compound and a binder resin which are added to reduce the refractive index.

The inorganic silicon-containing compound is preferably silica, and particularly preferably hollow silica since the refractive index of the antireflection layer 16 is easily reduced.

The mean particle diameter of the hollow silica is preferably 5 nm to 180 nm, and more preferably 30 nm to 100 nm. When the mean particle diameter of the hollow silica is 5 nm or greater, the refractive index is easily reduced. When the mean particle diameter of the hollow silica is 180 nm or less, it is possible to densely fill the antireflection layer. Regarding the mean particle diameter, the maximum length of a particle image (Dmax: the maximum length between two points on the contour of the particle image) and the maximum perpendicular length (DV-max: when the particle image is interposed between two straight lines parallel to the maximum length, the minimum length between the two straight lines) are measured using a transmission electron microscope, and a geometric mean value $(Dmax \times DV\text{-}max)^{1/2}$ is set as the particle diameter. Particle diameters of 100 particles are measured using this method, and a calculated mean value thereof is set as the mean particle diameter.

In addition, in the hollow silica, the larger the number of hollow portions, the easier the refractive index is reduced. Thus, the thickness of the outer shell is preferably smaller than the particle diameter.

Examples of the binder resin include the thermosetting or active energy ray curable resin components exemplified in the description of the hard coating layer 42. Among these, the active energy ray curable resin component is preferred, and a polymer which is obtained by polymerization of a multifunctional (meth)acrylic monomer is more preferred due to excellent surface hardness, transparency, scratch resistance, or the like.

In addition, a silicone compound is preferably used as the binder resin since the refractive index of the antireflection layer 43 is easily reduced. Examples of the silicone compound include organopolysiloxanes having an alkylene group (an ethylene group, a propylene group, a butylene group, a hexylene group, an octylene group, or the like), a cycloalkylene group (a cyclohexylene group or the like), an arylene group (a phenylene group or the like), an alkyl group (a methyl group, an ethyl group, a propyl group, a butyl group, a hexyl group, an octyl group, a decyl group, or the like), a cycloalkyl group (a cyclohexyl group or the like), an alkenyl group (a vinyl group, an allyl group, a propenyl group, a butenyl group, a hexenyl group, or the like), an aralkyl group (an aryl group such as a phenyl group or a tolyl group, a benzyl group, a phenylethyl group, or the like), or the like.

As the binder resin, a fluorine-containing resin may be used.

The amount of the inorganic silicon-containing compound in the antireflection layer 43 is preferably 20 mass % to 80 mass %, and more preferably 30 mass % to 70 mass % with respect to the solid content of the antireflection layer 43 set to 100 mass %. When the amount of the inorganic silicon-containing compound is 20 mass % or greater, the refractive index of the antireflection layer 43 is sufficiently reduced, and thus a high light transmittance is easily obtained. When the amount of the inorganic silicon-containing compound is 80 mass % or less, an insufficient of the binder resin in the antireflection layer 43 is easily prevented.

The amount of the binder resin in the antireflection layer 43 is preferably 20 mass % to 80 mass %, and more preferably 30 mass % to 70 mass % with respect to the solid content of the antireflection layer 43 set to 100 mass %. When the amount of the binder resin is 20 mass % or greater, the adhesion to the lower layer is improved. When the amount of the inorganic silicon-containing compound is 80 mass % or less, an insufficient amount of the inorganic silicon-containing compound in the antireflection layer 43 is easily prevented, and thus the refractive index of the antireflection layer 43 is easily reduced.

The layer containing the inorganic silicon-containing compound and the binder resin can be formed by coating the hard coating layer 42 with an antireflection layer forming composition containing the inorganic silicon-containing compound and the binder resin as essential components and containing other components if desired, and by then performing curing.

The antireflection layer forming composition preferably contains a photopolymerization initiator in order to promote hardening as in the case of the hard coating layer forming composition (A). In addition, a photosensitizer may be further contained. The antireflection layer forming composition may contain a solvent as in the case of the hard coating layer forming composition (A). Examples of the solvent used in the antireflection layer forming composition include the solvents exemplified in the case of the hard coating layer forming composition (A), and the solvent also has the same preferred aspect.

The amount of the inorganic silicon-containing compound to be blended in the antireflection layer forming composition is preferably 20 mass % to 80 mass %, and more preferably 30 mass % to 70 mass % with respect to the solid content of the antireflection layer forming composition set to 100 mass %. When the amount of the inorganic silicon-containing compound to be blended is 20 mass % or greater, an antireflection layer 16 having a sufficiently low refractive index is easily obtained. When the amount of the inorganic silicon-containing compound to be blended is 80 mass % or less, the binder resin can be sufficiently blended, and thus an antireflection body which is excellent in the adhesion to the lower layer is easily obtained.

The amount of the binder resin to be blended in the antireflection layer forming composition is preferably 20 mass % to 80 mass %, and more preferably 30 mass % to 70 mass % with respect to the solid content of the antireflection layer forming composition set to 100 mass %. When the amount of the binder resin to be blended is 20 mass % or greater, the adhesion to the lower layer is improved. When the amount of the binder resin to be blended is 80 mass % or less, the inorganic silicon-containing compound can be sufficiently blended, and thus an antireflection body having a low reflectance is easily obtained.

The amount of the photopolymerization initiator to be blended in the antireflection layer forming composition is preferably 0.5 mass % to 10 mass %, and more preferably 2 mass % to 8 mass % with respect to the solid content of the antireflection layer forming composition set to 100 mass %. When the amount of the photopolymerization initiator to be blended is 0.5 mass % or greater, incomplete hardening is less likely to occur. When the photopolymerization initiator is blended in an amount greater than 10 mass %, a hardening promotion effect corresponding to the amount to be blended is not obtained and the cost is also increased. In addition, the photopolymerization initiator may remain in the cured material, and thus cause yellowing, bleeding out, or the like.

Examples of the method of coating the hard coating layer 42 with the antireflection layer forming composition include the same method as the coating method with the hard coating layer forming composition (A).

The amount of the antireflection layer forming composition to be coated is set according to the thickness of the antireflection layer 43 to be formed.

The coating film formed on the hard coating layer 42 using the antireflection layer forming composition can be cured by irradiation of active energy rays when the binder resin is an active energy ray curable material. The curing by irradiation of active energy rays can be performed using the same method as the curing of the coating film formed using the hard coating layer forming composition (A). When the binder resin is a thermosetting material, the coating film can be cured by heating using a heating furnace, an infrared lamp, or the like.

The curing may be performed in one stage or in two stages of a precuring process and a main curing process.

As in the case of the protective sheet 4, the protective sheet 4-2 preferably has a total light transmittance greater than 90% and a haze less than 1%. It is useful as a protective sheet for a touch panel or a display device when these requirements are satisfied.

In the protective sheet 4-2, a water contact angle of the surface 43$a$ on the side of the antireflection layer 43 (on the opposite side to the base material 41) is preferably 105° or less, more preferably 90° or less, and even more preferably 85° or less. Accordingly, when the polarizing plate 12 is stuck to the surface 43$a$ of the antireflection layer 43 of the protective sheet 4 via the adhesive layer 31, an excellent adhesion strength is obtained.

The water contact angle of the surface 43$a$ is preferably 5° or greater from the viewpoint of easy control, and more preferably 50° or greater from the viewpoint of printing and processing suitability such as a recoating property.

The range of the water contact angle of the surface 43$a$ is preferably 5° to 105°, more preferably 50° to 90°, and even more preferably 55° to 85°.

The water contact angle can be measured through a method in which using a contact angle measuring device, a droplet of 2 μL of pure water is dripped to the surface 43$a$ on the side of the hard coating layer 43 in the protective sheet 4, and a droplet shape after 10 seconds from the dripping is photographed by a CCD camera to perform an image process.

The water contact angle of the surface 43$a$ can be adjusted according to the material constituting the antireflection layer 43, the manufacturing method, or the like. For example, the water contact angle can be reduced by reducing the amount of the fluorine-containing resin to be used as the resin binder or the amount of the organic silicon-containing compound such as the silicone compound to be used.

Here, an example has been shown in which the antireflection layer 43 is provided on the hard coating layer 42 having the irregular surface 42a on the opposite side to the base material 41 to reflect the shape of the surface 42a, but the invention is not limited thereto. For example, in place of the hard coating layer 42, a hard coating layer having an even surface 42a may be provided and an antireflection layer having an irregular surface may be formed thereon. In this case, the formation of the antireflection layer having an irregular surface can be performed in the same manner as in the formation of the hard coating layer 42 having an irregular surface, and examples thereof include a method of blending particles in an antireflection layer forming material, and a method of forming an antireflection layer using two resin components having different solubility parameter (SP) values to precipitate one resin component through phase separation.

The protective sheet shown in FIG. 4 (hereinafter, protective sheet 4-3) is the same as the protective sheet 4, except that a second hard coating layer 44 and a conductive layer 45 are further laminated in this order on a surface of the base material 41 on the opposite side to the side on which the hard coating layer 42 is provided.

When such a protective sheet 4-3 is used in place of the protective sheet 4, the conductive layer 2 and the conductive layer 45 are opposed to each other via the adhesive layer 3 in the touch panel 21.

The second hard coating layer 44 can be formed using known methods. For example, it can be formed in the same manner as in the case of the hard coating layer 42. However, a surface on the opposite side to the base material side of the second hard coating layer 44 may have or may not have irregularities, and is preferably smooth in view of provision of the conductive layer 45 on the surface. The hard coating layer having a smooth surface on the opposite side to the base material side can be formed using a method using, as a hard coating layer forming material, a material containing no particles or containing particles having a smaller particle diameter than the thickness of the hard coating layer to be formed.

The description of the conductive layer 45 is the same as that provided for the conductive layer 2. However, the conductive layers may be the same as or different from each other in terms of material and thickness.

The protective sheet shown in FIG. 5 (hereinafter, protective sheet 4-4) is the same as the protective sheet 4-2, except that a second hard coating layer 44 and a conductive layer 45 are further laminated in this order on a surface of the base material 41 on the opposite side to the side on which the hard coating layer 42 and the antireflection layer 43 are provided.

The second hard coating layer 44 and the conductive layer 45 are the same as the second hard coating layer 44 and the conductive layer 45 of the protective sheet 4-3, respectively.

(Printing Layer 5)

The printing layer 5 is formed for hiding or decoration of an internal circuit.

The printing layer 5 can be formed by, for example, printing a colored ink containing a colorant (a pigment or a dye) and a binder (a polyvinyl resin, a polyamide resin, a polyacrylic resin, a polyurethane resin, a polyvinyl acetal resin, a polyester urethane resin, a cellulose ester resin, or an alkyd resin). In the case of metallic color development, particles of a metal such as aluminum, titanium, or bronze, or a pearl pigment in which mica is coated with titanium oxide can be used.

The thickness of the printing layer 5 is preferably 5 µm to 50 µm, and more preferably 10 µm to 30 µm.

The thickness of the printing layer 5 can be measured using the method based on JIS-K7130.

As a method of forming the printing layer 5 (printing method), an offset printing method, a gravure printing method, a screen printing method, a thermal transfer printing method, an inkjet printing method, or the like is applied, and a screen printing method is preferred.

<Second Embodiment>

Figure 6:
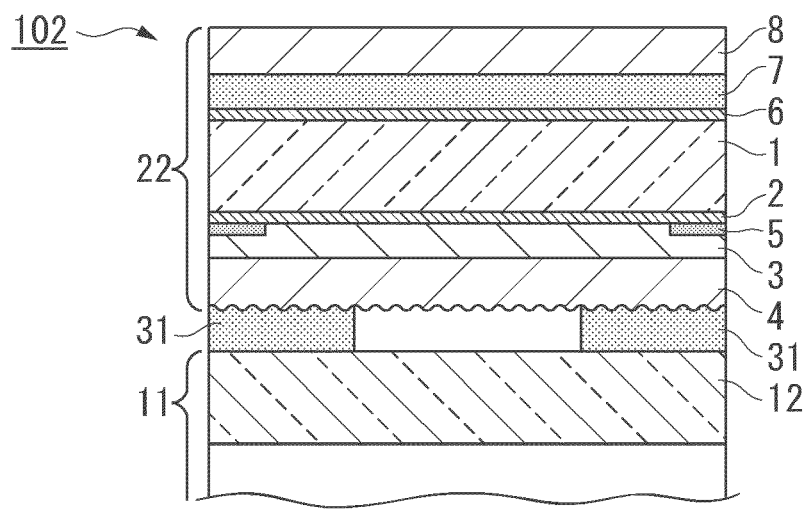
FIG. 6 is a schematic cross-sectional view showing a configuration of a display device with a capacitive touch panel according to a second embodiment of the invention.

FIG. 6 is a schematic cross-sectional view showing a configuration of a display device 102 with a capacitive touch panel of a second embodiment of the invention. In the embodiment to be described hereinbelow, the constituent elements corresponding to those of the first embodiment will be denoted by the same reference signs, and detailed descriptions thereof will be omitted here.

The display device 102 with a capacitive touch panel has the same configuration as the display device 101 with a capacitive touch panel of the first embodiment, except that a touch panel 22 is provided in place of the touch panel 21.

The touch panel 22 has the same configuration as the touch panel 21, except that a conductive layer 6 provided in front of a transparent substrate 1 and a protective sheet 8 laminated on the conductive layer 6 via an adhesive layer 7 are further provided.

The description of the conductive layer 6 is the same as that provided for the conductive layer 2. However, the conductive layers may be the same as or different from each other in terms of material and thickness.

The description of the adhesive layer 7 is the same as that provided for the adhesive layers 3 and 31. However, the adhesive layers may be the same as or different from each other in terms of material and thickness.

The description of the protective sheet 8 is the same as that provided for the protective sheet 4. However, the protective sheets may be the same as or different from each other in material and thickness. In addition, the protective sheet 8 does not necessarily have an irregular front or back surface, and is preferably smooth without irregularities in both of the front surface and the back surface.

<Third Embodiment>

Figure 7:
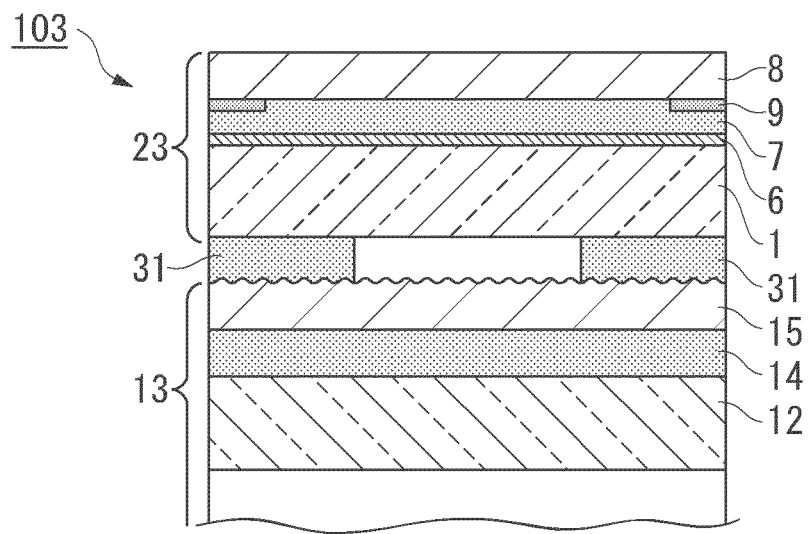
FIG. 7 is a schematic cross-sectional view showing a configuration of a display device with a capacitive touch panel according to a third embodiment of the invention.

FIG. 7 is a schematic cross-sectional view showing a configuration of a display device 103 with a capacitive touch panel of a third embodiment of the invention.

In the display device 103 with a capacitive touch panel, a surface roughness of 1.5 nm to 400 nm is given, not to a back surface of a touch panel, but to a front surface of a liquid crystal display.

The display device 103 with a capacitive touch panel includes a liquid crystal display 13 and a touch panel 23. The touch panel 23 is disposed in front of the liquid crystal display 13 such that a gap is provided between the touch panel 23 and the liquid crystal display 13, and its outer edge is fixed to the liquid crystal display 13 via an adhesive layer 31. Accordingly, a space is formed between the front surface of the liquid crystal display 13 and the back surface of the touch panel 23.

The touch panel 23 includes a transparent substrate 1, a conductive layer 6 provided in front of the transparent substrate 1, and a protective sheet 8 laminated on the conductive layer 6 via an adhesive layer 7, and a printing layer 9 is formed in an outer edge of a back surface of the protective sheet 8.

A protective sheet 15 is laminated on a front surface of a polarizing plate 12 via an adhesive layer 14 in the liquid crystal display 13. One surface of the protective sheet 15 is an irregular surface having minute irregularities, and the surface roughness of the irregular surface is 1.5 nm to 400 nm. When this protective sheet 15 is disposed so that its irregular surface is opposed to the touch panel 23, a surface of the liquid crystal display 13 opposed to the touch panel 23 has a surface roughness of 1.5 nm to 400 nm.

The range of the surface roughness of the irregular surface is preferably 2 nm to 380 nm, and more preferably 3 nm to 350 nm.

The description of the printing layer 9 is the same as that provided for the printing layer 5.

The description of the adhesive layer 14 is the same as that provided for the adhesive layers 3 and 31. However, the adhesive layers may be the same as or different from each other in terms of material and thickness.

The description of the protective sheet 15 is the same as that provided for the protective sheet 4.

<Fourth Embodiment>

Figure 8:
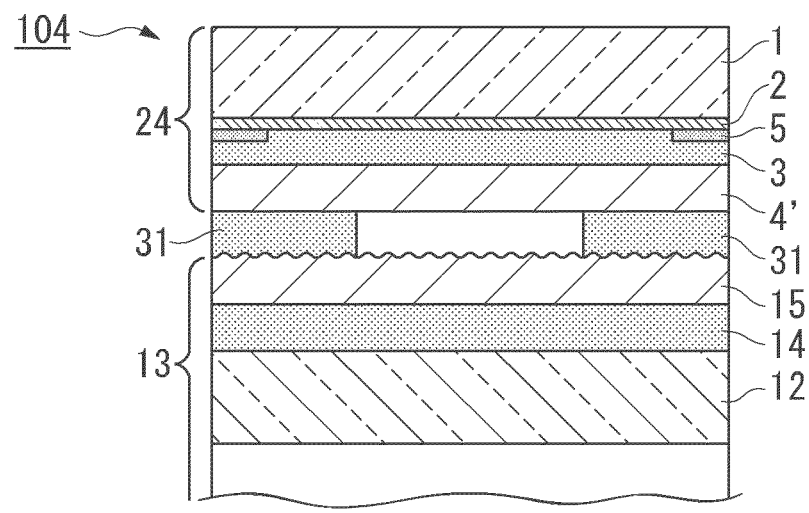
FIG. 8 is a schematic cross-sectional view showing a configuration of a display device with a capacitive touch panel according to a fourth embodiment of the invention.
Figure 9:
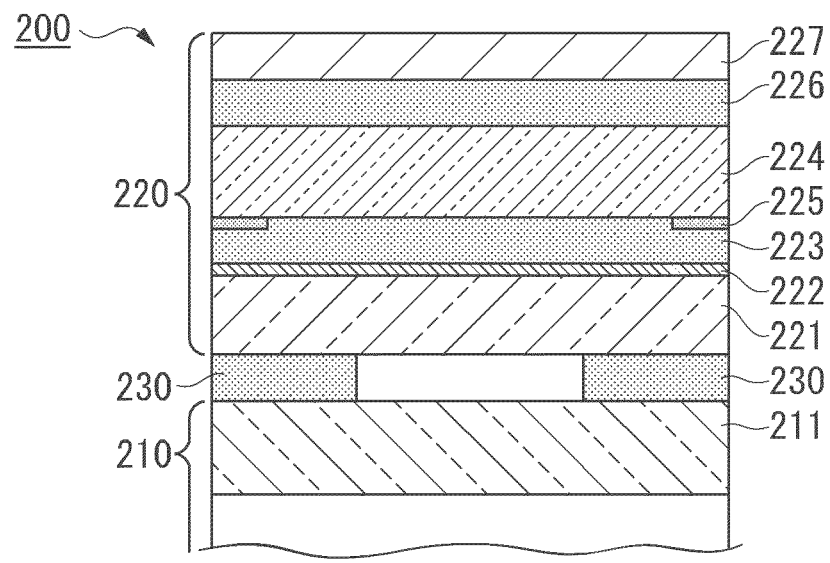
FIG. 9 is a schematic cross-sectional view showing a configuration of a conventional display device with a capacitive touch panel.

FIG. 8 is a schematic cross-sectional view showing a configuration of a display device 104 with a capacitive touch panel of a fourth embodiment of the invention.

The display device 104 with a capacitive touch panel has the same configuration as the display device 103 with a capacitive touch panel of the third embodiment, except that a touch panel 24 is provided in place of the touch panel 23.

The touch panel 24 has the same configuration as the touch panel 21 of the first embodiment, except that a protective sheet 4' is provided in place of the protective sheet 4.

The description of the protective sheet 4' is the same as that provided for the protective sheet 4. However, the protective sheets may be the same as or different from each other in terms of material and thickness. In addition, the protective sheet 4' does not necessarily have an irregular back surface (on the liquid crystal display side), and is preferably smooth in the back surface in view of transparency of the protective sheet 4'.

Although the first to fourth embodiments have been described, the invention is not limited to these embodiments.

For example, in the first to fourth embodiments, an example has been shown in which the liquid crystal display is used as the display unit, but the invention is not limited thereto. For example, various display units such as a cathode ray tube (CRT) display, a plasma display, and an electroluminescence (EL) display can be used.

In the third and fourth embodiments, an example has been shown in which the protective sheet in which the hard coating layer is provided on the base material is laminated on the polarizing plate via the adhesive layer. However, a hard coating layer having a predetermined surface roughness may be directly formed on the polarizing plate.

Another aspect of the invention relates to a display device with a capacitive touch panel including: a display device; and a capacitive touch panel which is disposed in front of the display unit such that a gap is provided between the capacitive touch panel and the display unit, wherein the capacitive touch panel has an outer edge which is fixed to the display unit via an adhesive layer therebetween, wherein the capacitive touch panel includes one transparent substrate, a conductive layer which is provided behind the transparent substrate, and a protective sheet which is laminated on the conductive layer via an adhesive layer, wherein the protective sheet includes a base material and a hard coating layer, wherein the hard coating layer is a cured material obtained by curing a hard coating layer forming composition containing a multifunctional (meth)acrylic monomer with active energy rays, wherein the protective sheet has a surface having a surface roughness of 1.5 nm to 400 nm, and wherein the surface is opposed to the display unit.

Still another aspect of the invention relates to a display device with a capacitive touch panel including: a display unit; and a capacitive touch panel which is disposed in front of the display unit such that a gap is provided between the capacitive touch panel and the display unit, wherein the capacitive touch panel has an outer edge which is fixed to the display unit via an adhesive layer therebetween, wherein the capacitive touch panel includes one transparent substrate, a conductive layer which is provided behind the transparent substrate, and a protective sheet which is laminated on the conductive layer via an adhesive layer, wherein the protective sheet includes a base material and a hard coating layer, wherein the hard coating layer is a cured material obtained by curing a hard coating layer forming composition containing a multifunctional (meth)acrylic monomer with active energy rays, wherein in the display unit, a surface has a surface roughness of 1.5 nm to 400 nm, and wherein in the display unit, the surface is opposed to the capacitive touch panel.

Still another aspect of the invention relates to a display device with a capacitive touch panel including: a display unit; and a capacitive touch panel which is disposed in front of the display unit such that a gap is provided between the capacitive touch panel and the display unit, wherein the capacitive touch panel has an outer edge which is fixed to the display unit via an adhesive layer therebetween, wherein the capacitive touch panel includes one transparent substrate, a conductive layer which is provided on the opposite side to the display unit side of the transparent substrate, and a protective sheet which is laminated on the conductive layer via an adhesive layer, wherein the protective sheet includes a base material and a hard coating layer, wherein the hard coating layer is a cured material obtained by curing a hard coating layer forming composition containing a multifunctional (meth)acrylic monomer with active energy rays, wherein in the display unit, a surface has a surface roughness of 1.5 nm to 400 nm, and wherein in the display unit, the surface is opposed to the capacitive touch panel.

Still another aspect of the invention relates to a capacitive touch panel which is disposed in front of a display unit such that a gap is provided between the capacitive touch panel and the display unit, wherein the capacitive touch panel has an outer edge which is fixed to the display unit via an adhesive layer therebetween, including: one transparent substrate; a conductive layer which is provided behind the transparent substrate; and a protective sheet which is laminated on the conductive layer via an adhesive layer, wherein the protective sheet includes a base material and a hard coating layer, wherein the hard coating layer is a cured material obtained by curing a hard coating layer forming composition containing a multifunctional (meth)acrylic monomer with active energy rays, wherein the protective sheet has a surface having a surface roughness of 1.5 nm to 400 nm, and wherein the surface is opposed to the display unit.

Still another aspect of the invention relates to a capacitive touch panel which is disposed in front of a display unit such that a gap is provided between the capacitive touch panel and the display unit, wherein the capacitive touch panel has an outer edge which is fixed to the display unit via an adhesive layer therebetween, including: one transparent substrate; a conductive layer which is provided behind the transparent substrate; a protective sheet which is laminated on the conductive layer via an adhesive layer; a conductive layer which is provided on the opposite side to the display unit side of the transparent substrate; and a protective sheet which is laminated on the conductive layer via an adhesive layer, wherein the protective sheet includes a base material and a hard coating layer, wherein the hard coating layer is a cured material obtained by curing a hard coating layer forming composition containing a multifunctional (meth) acrylic monomer with active energy rays, wherein the protective sheet has a surface having a surface roughness of 1.5 nm to 400 nm, and wherein the surface is opposed to the display unit.

EXAMPLES

Hereinafter, the invention will be described in further detail with examples, but is not limited to these examples.

The particle diameter of silica particles contained in a colloidal silica dispersion liquid used in the following examples is a mean particle diameter. Regardless of a powder form or a slurry form, first, 200 g of a 3 mass % aqueous dispersion is prepared, subjected to dispersion by stirring for 10 minutes at 1,000 rpm using a commercially available homomixer, and then immediately observed using an electron microscope (TEM) to take an electron microscope photograph by a factor of 10,000 to 500,000 so that approximately 50 particles are observed within a radius of 5 cm. Martin's diameters are measured within a radius of 5 cm and averaged (see "Fine Particle Handbook", Asakusa Shoten, p. 52, 1991).

Example 1

(Preparation of Hard Coating Layer Forming Composition)

35 parts by mass of dipentaerythritol hexaacrylate (hexafunctional acrylate, product name: DPHA, manufactured by Daicel-Cytec Company Ltd.) and 65 parts by mass of diethylene glycol diacrylate (bifunctional acrylate, product name: SR230, manufactured by Sartomer Company Inc.) as multifunctional (meth)acrylates, 2.5 parts by mass of a colloidal silica dispersion liquid having a particle diameter of 100 nm (product name: SIRMIBK15WT %-E65, manufactured by CIK Nano Tek Corporation) as an antiblocking agent, 4 parts by mass of a photopolymerization initiator (product name: IRGACURE 184, manufactured by BASF), 4 parts by mass of a light stabilizer (product name: TINUVIN152, manufactured by BASF), and a mixed solvent as a diluting solvent in which methyl ethyl ketone and cyclohexanone are mixed at 1:1 (mass ratio) were mixed so that the solid content was 50 mass %, thereby preparing a hard coating layer forming composition (A1).

In the above description, the amount of each of the components to be blended, other than the solvent, represents the amount to be blended as a solid content, and has the same usage below.

(Preparation of Protective Sheet)

A PET film having a thickness of 50 μm (product name: A4300, manufactured by Toyobo Co., Ltd.) was used as a base material, and this base material was bar-coated with the hard coating layer forming composition (A1). Thereafter, the composition was dried by heating for 60 seconds at 80° C. and was irradiated with ultraviolet rays using a high pressure mercury lamp ultraviolet ray irradiation device (manufactured by Eye Graphics Co., Ltd.) under conditions of 160 W/cm, 13 cm lamp height, 10 m/min belt speed, and two passes under a nitrogen atmosphere to form a hard coating layer having a thickness of 3 μm by curing, thereby obtaining a hard coating film.

(Evaluation)

The following evaluation was performed on the obtained hard coating film. The results are shown in Table 1.

[Steel Wool Scratch Resistance]

An adhesive layer was transferred by peeling a separate film of a non-carrier double-sided adhesive film (product name: CCL/D1/T3T3, manufactured by New Tac Kasei Co., Ltd.) on the base material side of the obtained hard coating film, and the hard coating film was stuck to a black acrylic plate having a specular gloss via the adhesive layer. #0000 steel wool was placed on the hard coating layer of this hard coating film to perform rubbing by reciprocating 50 times for a distance of 9 cm at a load of 200 g/cm$^2$. After rubbing, whether scratches were formed was visually observed. The case in which there were no scratches was graded A, and the case in which there were scratches was graded B.

[Water Contact Angle]

Using a contact angle measuring device manufactured by Kyowa Interface Science Co., Ltd. (model No. DM-501), a droplet of 2 μL of pure water was dripped onto a surface of the hard coating film as a measurement target on the hard coating layer side, and an image of a droplet shape obtained by a CCD camera after 10 seconds was processed to obtain a contact angle.

A reduction in the water contact angle indicates a reduction in the water repellency. The smaller the water contact angle, the greater the adhesion force to the adhesive layer (31) and the more preferable it is. The water contact angle is preferably 105° or less, more preferably 90° or less, and even more preferably 85° or less.

[Tape Adhesion Force]

A tape adhesion force to a surface (irregular surface) of the hard coating film on the hard coating layer side was evaluated with the following procedures.

A double-sided tape (product name: #4972, manufactured by Tesa) was used as a tape, and a product was prepared by sticking a PET film (product name: A4300, manufactured by Toyobo Co., Ltd.) having a thickness of 100 μm to one surface of the tape.

An adhesive layer was transferred by peeling a separate film of a non-carrier double-sided adhesive film (product name: CCL/D1/T3T3, manufactured by New Tac Kasei Co., Ltd.) on the base material side of the obtained hard coating film, and the hard coating film was stuck to a glass plate via the adhesive layer. The resulting material was set as an adherend.

The above-described tape was stuck to the hard coating film surface of the adherend, and a 2 kg roller was moved in a reciprocating manner one time. Then, the adhesion force (N/25 mm) after 24 hours was measured using an autograph (manufactured by Shimadzu Corporation).

[Optical Property]

An adhesive was prepared by mixing 100 parts by mass of an acrylic adhesive (product name: SK Dyne 1811 L, manufactured by Soken Chemical Engineering Co., Ltd.), 1 part by mass of an isocyanate crosslinking agent (product name: L-45, manufactured by Soken Chemical Engineering Co., Ltd.), and 67.4 parts by mass of ethyl acetate as a diluting solvent.

This adhesive was coated using an applicator on the base material surface of the obtained hard coating film on the opposite side to the hard coating layer so that a film thickness after drying was 25 μm. Thereafter, the adhesive was dried by heating for 120 seconds at 100° C., stuck to a separate film (product name: 38RL-07(2), manufactured by Oji Specialty Paper Co., Ltd.), and subjected to aging for a crosslinking reaction for one week at a temperature of 23° C. and a relative humidity of 50% to obtain an adhesive film.

The separate film of the obtained adhesive film was peeled to expose the adhesive layer to thus stick the hard coating film to a glass plate for examination via the adhesive layer without air or dust entering therebetween.

The total light transmittance and the haze of the hard coating film stuck to the glass plate for examination were measured through the methods based on JIS-K7361-1 and JIS-K7136, respectively, using NDHSO00 manufactured by Nippon Denshoku Industries Co., Ltd. When the total light transmittance was greater than 90% and the haze was less than 1%, the hard coating film can be applied for use in optical applications.

[Surface Roughness of Irregular Surface]

An adhesive layer was exposed by peeling a separate film of an adhesive film obtained in the same manner as in the optical property evaluation, and a surface roughness of a surface (irregular surface) of a hard coating film on the hard coating layer side was measured from the adhesive layer side using the following procedures.

(Method of Measuring Surface Roughness)

Image capturing was performed in a 10 μm by 10 μm measurement area in a measurement mode set to a tapping mode using a scanning probe microscope (Nanoscope IIV and Nanoscope IIIa manufactured by Veeco Instruments Inc.) and using a Si single crystal probe as a probe. Using analysis software attached to the scanning probe microscope, a flatten process (zero-order) and a plane-fit process (XY) were performed one time on an obtained image, respectively, as incrementing processes for removing waviness, and then the surface roughness was calculated.

[Presence or Absence of Newton's Rings]

A polarizing plate having a hard coating surface was prepared. The surface roughness of the hard coating surface was measured in accordance with the above-described procedures, and was 4 nm.

Separately, a surface of the obtained hard coating film on the base material side was stuck to one surface of a glass plate having a thickness of 1 mm to provide an evaluation sample.

The evaluation sample was fixed at a position separated by 300 μm from a hard coating surface of the surface of the polarizing plate, so that a surface on the hard coating film side was parallel to the hard coating surface toward the polarizing plate. Then, the evaluation sample was pressed by a finger against the hard coating surface of the surface of the polarizing plate to visually confirm the presence or absence of Newton's rings at the time when the finger was separated. At this time, the case in which there was no Newton's rings was graded A, the case in which there was slight Newton's rings was graded B, and the case in which there was clear Newton's rings was graded C.

[Adhesiveness to Polarizing Plate]

Adhesiveness of the hard coating film of the evaluation sample to the surface of the polarizing plate at the time when the finger pressing the evaluation sample against the polarizing plate was separated in the evaluation of the [Presence or Absence of Newton's Rings] was subjected to sensory evaluation. Five points were given for the case in which the hard coating film was not adhered, three points were given for the case in which the hard coating film was slightly adhered, but immediately separated, and one point was given for the case in which the hard coating film was strongly adhered and not separated. A score increase indicates a reduction in the adhesion to the polarizing plate.

Example 2

A hard coating layer forming composition (A2) was prepared in the same manner as in the (Preparation of Hard Coating Layer Forming Composition) of Example 1, except that the amount of a colloidal silica dispersion liquid (product name: SIRMIBK15WT %-E65, manufactured by CIK Nano Tek Corporation) as an antiblocking agent to be blended was changed from 2.5 parts by mass to 5.5 parts by mass. A hard coating film was prepared in the same manner as in Example 1, except that this hard coating layer forming composition (A2) was used in place of the hard coating layer forming composition (A1), and the evaluation was performed. The results are shown in Table 1.

Example 3

The hard coating layer of the hard coating film obtained in Example 1 was coated with an antireflection layer forming material (product name: TU2205, manufactured by JSR, refractive index: 1.35, solvent: methyl isobutyl ketone) using a bar coater so that a film thickness after drying was 100 nm. Thereafter, the material was dried for 60 seconds at 80° C. and was irradiated with ultraviolet rays using a high pressure mercury lamp ultraviolet ray irradiation device (manufactured by Fusion) under conditions of 240 W/cm, 10 cm lamp height, 10 m/min belt speed, and two passes under a nitrogen atmosphere to perform forming by curing, thereby obtaining a low reflection film.

The same evaluation as in Example 1 (however, a surface on the antireflection layer side was a surface (irregular surface) on the hard coating layer side) was performed on the obtained low reflection film. The results are shown in Table 1.

Example 4

90.0 parts by mass of cyclohexyl methacrylate (product name: Light Ester CH, manufactured by Kyoeisha Chemical Co., Ltd.) and 1.3 parts by mass of n-butyl methacrylate (product name: Light Ester NB, manufactured by Kyoeisha Chemical Co., Ltd.) as monofunctional acrylates, 4.7 parts by mass of methacrylic acid (product name: Light Ester A, manufactured by Kyoeisha Chemical Co., Ltd.), 3.7 parts by mass of n-dodecyl mercaptan (product name: Thiokalcol 20, manufactured by Kao Corporation) as a molecular weight regulator, 0.3 parts of 2,2'-azobisisobutyronitrile (manufactured by Tokyo Chemical Industry Co., Ltd.) as a polymerization initiator, and 286 parts by mass of propylene glycol monomethyl ether as a solvent were put into a reaction container provided with a nitrogen gas introduction can, a stirring device, and a thermometer to stir and heat the reaction mixture to 80° C. while circulating nitrogen gas, thereby obtaining an acrylic polymer (C1) having a weight average molecular weight of 7200. The acrylic polymer (C1) had a SP value of 10.0 and a Tg of 65° C.

0.5 parts by mass of the obtained acrylic polymer C1, 91.5 parts by mass of pentaerythritol triacrylate (product name: M-305, manufactured by Toagosei Co., Ltd., SP value: 12.7, Tg: 250° C.) as a tetrafunctional acrylate, 4 parts by mass of a photopolymerization initiator (product name: IRGACURE 184, manufactured by BASF), 4 parts by mass of a light stabilizer (product name: TINUVIN152, manufactured by BASF), and a mixed solvent as a diluting solvent in which isopropyl alcohol and isobutyl alcohol are mixed at 1:1 (mass ratio) were mixed so that the solid content was 40 mass %, thereby preparing a hard coating layer forming composition (A3). A hard coating film was made in the same manner as in Example 1, except that this hard coating layer forming composition (A3) was used in place of the hard coating layer forming composition (A1), and was evaluated. The results are shown in Table 1.

Comparative Example 1

A hard coating layer forming composition (B1) was prepared in the same manner as in the (Preparation of Hard Coating Layer Forming Composition) of Example 1, except that the antiblocking agent was not added. A hard coating film was prepared in the same manner as in Example 1, except that this hard coating layer forming composition (B1) was used in place of the hard coating layer forming composition (A1), and was evaluated. The results are shown in Table 1.

Comparative Example 2

A hard coating layer forming composition (B2) was prepared in the same manner as in the (Preparation of Hard Coating Layer Forming Composition) of Example 1, except that 3 parts by mass of silica particles (product name: Sylysia 310, manufactured by Fuji Sylysia Chemical Ltd.) having a particle diameter of 1.4 μm was added in place of the antiblocking agent. A hard coating film was prepared in the same manner as in Example 1, except that this hard coating layer forming composition (B2) was used in place of the hard coating layer forming composition (A1), and was evaluated. The results are shown in Table 1.

the hard coating film of Example 1 was deteriorated compared to Example 1 in the tape adhesion force, but was improved in the total light transmittance. The reason is thought to be that since the antireflection layer is provided, the reflection of the air layer between the protective sheet and the polarizing plate is suppressed.

The hard coating film of Example 4 had a higher haze value than Example 1, and was thus slightly deteriorated in the optical property. However, the hard coating film of Example 4 was superior in the adhesiveness to the polarizing plate and had an excellent anti-Newton ring performance. The reason is thought to be that since the surface roughness is high, the contact with the polarizing plate is hindered.

The hard coating film of Comparative Example 1 of which the irregular surface has a surface roughness of 1 nm had a poor anti-Newton ring performance.

The hard coating film of Comparative Example 2 of which the irregular surface has a surface roughness of 500 nm had low transparency.

INDUSTRIAL APPLICABILITY

A display device with a capacitive touch panel and a capacitive touch panel of the invention can be used in cellular phones, portable game machines, and the like, since Newton's rings are less likely to occur and the brightness of a touch surface is superior.

REFERENCE SIGNS LIST

1: TRANSPARENT SUBSTRATE
2: CONDUCTIVE LAYER
3: ADHESIVE LAYER
4: PROTECTIVE SHEET
4': PROTECTIVE SHEET

TABLE 1

| Evaluation Items | Example 1 | Example 2 | Example 3 | Example 4 | Comparative Example 1 | Comparative Example 2 |
|---|---|---|---|---|---|---|
| Water Contact Angle (degrees) | 80 | 82 | 105 | 80 | 78 | 85 |
| Tape Adhesion Force (N/25 mm) | 14 | 14 | 2.0 | 16 | 2.0 | 10 |
| Scratch Resistance | A | A | A | A | A | A |
| Optical Property Total Light Transmittance (%) | 90.7 | 90.3 | 94.0 | 90.3 | 91.0 | 89.5 |
| Haze (%) | 0.5 | 0.9 | 0.6 | 0.9 | 0.5 | 1.5 |
| Surface Roughness of Irregular Surface (nm) | 80 | 200 | 50 | 300 | 1 | 500 |
| Presence or Absence of Newton's Rings | B | A | A | A | C | A |
| Adhesiveness to Polarizing Plate | 3 points | 5 points | 4 points | 5 points | 1 point | 5 points |

As shown in the above results, the hard coating films of Examples 1 and 2 had a smaller surface roughness than conventional anti-Newton ring films, but the adhesion to the polarizing plate was sufficiently suppressed. Thus, the hard coating films of Examples 1 and 2 had an excellent anti-Newton ring performance. In addition, these were also superior in the optical property having a trade-off relation to the anti-Newton ring performance, and had sufficient transparency as a protective sheet to be disposed in front of a display unit. Furthermore, these were also superior in the tape adhesion force, scratch resistance, and the like.

The low reflection film of Example 3 in which the antireflection layer was provided on the hard coating layer of 5: PRINTING LAYER
6: CONDUCTIVE LAYER
7: ADHESIVE LAYER
8: PROTECTIVE SHEET
9: PRINTING LAYER
11: LIQUID CRYSTAL DISPLAY
12: POLARIZING PLATE
13: LIQUID CRYSTAL DISPLAY
14: ADHESIVE LAYER
15: PROTECTIVE SHEET
21 to 24: CAPACITIVE TOUCH PANEL
31: ADHESIVE LAYER
41: BASE MATERIAL 42: HARD COATING LAYER
43: ANTIREFLECTION LAYER
101 to 104: DISPLAY DEVICE WITH CAPACITIVE TOUCH PANEL

What is claimed is:

1. A display device with a capacitive touch panel comprising:
    a display unit; and
    a capacitive touch panel which is disposed in front of the display unit such that a gap is provided between the capacitive touch panel and the display unit,
        wherein the capacitive touch panel has an outer edge which is fixed to the display unit via an adhesive layer therebetween,
        wherein the capacitive touch panel is configured to contact the display unit when pressed by a finger,
    wherein the capacitive touch panel comprises one transparent substrate made of glass, a conductive film which is formed on the transparent substrate on a side facing the display, and a protective sheet which is laminated on the conductive film via an adhesive layer,
        wherein the protective sheet comprises a base material and a hard coating layer which has a haze of less than 1% as measured in accordance with JIS-K7136 and is provided on the base material on its side facing the display, and the hard coating layer has a surface having a surface roughness of 1.5 nm to 400 nm, thereby preventing the capacitive touch panel from staying adhered to the display unit when the finger pressing the display unit is released from the display unit, and
        wherein the surface is opposed to the display unit.

2. A capacitive touch panel which is disposed in front of a display unit such that a gap is provided between the capacitive touch panel and the display unit, and has an outer edge which is fixed to the display unit via an adhesive layer therebetween, and is configured to contact the display unit when pressed by a finger, and the capacitive touch panel comprising:
    one transparent substrate;
    a conductive film which is formed on the transparent substrate; and
    a protective sheet which is laminated on the conductive film via an adhesive layer,
        wherein the protective sheet comprises a base material and a hard coating layer which has a haze of less than 1% as measured in accordance with JIS-K7136 and is provided on the base material on its side facing the display, and the hard coating layer has a surface having a surface roughness of 1.5 nm to 400 nm thereby preventing the capacitive touch panel from staying adhered to the display unit when the finger pressing the display unit is released from the display unit, and
        wherein the surface is opposed to the display unit.

3. The capacitive touch panel according to claim 2, further comprising:
    a second conductive layer which is opposed to the display unit side of the transparent substrate; and
    a protective sheet which is laminated on the second conductive layer via an adhesive layer.

4. The display device with a capacitive touch panel according to claim 1, wherein the hard coating layer has a surface having a surface roughness of 3 nm to 400 nm.

5. The capacitive touch panel according to claim 2, wherein the hard coating layer has a surface having a surface roughness of 3 nm to 400 nm.

6. The display device with a capacitive touch panel according to claim 1, wherein the hard coating layer has a surface having a surface roughness of 50 nm to 400 nm.

7. The capacitive touch panel according to claim 2, wherein the surface of the hard coating layer has a surface having a surface roughness of 50 nm to 400 nm.

8. The display device with a capacitive touch panel according to claim 1, further comprising a protective film on the conductive layer for preventing oxidation of the conductive layer.

9. The capacitive touch panel according to claim 2, further comprising a protective film on the conductive layer for preventing oxidation of the conductive layer.

10. The capacitive touch panel according to claim 3, further comprising a protective film on the conductive layer for preventing oxidation the conductive layer.

11. The display device with a capacitive touch panel according to claim 4, further comprising a protective film on the conductive layer for preventing oxidation of the conductive layer.

12. The capacitive touch panel according to claim 5, further comprising a film firm on the conductive layer for preventing oxidation of the conductive layer.

13. The display device with a capacitive touch panel according to claim 6, further comprising a protective film on the conductive layer for preventing oxidation of the conductive layer.

14. The capacitive touch panel according to claim 7, further comprising a protective film on the conductive layer for preventing oxidation of the conductive layer.

15. The display device with a capacitive touch panel according to claim 1, wherein the hard coating layer is a cured form of a hard coating layer forming composition containing a multifunctional (meth)acrylic monomer and particles.

16. The capacitive touch panel according to claim 2, wherein the hard coating layer is a cured form of a hard coating layer forming composition containing a multifunctional (meth)acrylic monomer and particles.

17. The display device with a capacitive touch panel according to claim 1, wherein the hard coating layer is a cured form of a hard coating layer forming composition containing two or more resin components having different solubility parameter (SP) values.

18. The capacitive touch panel according to claim 2, wherein the hard coating layer is a cured form of a hard coating layer forming composition containing two or more resin components having different solubility parameter (SP) values.

19. The display device according to claim 1, wherein the transparent substrate is made of tempered glass.

* * * * *